US007024870B2

(12) United States Patent
Singh et al.

(10) Patent No.: US 7,024,870 B2
(45) Date of Patent: Apr. 11, 2006

(54) METHOD OF MANAGING A REFRIGERATION SYSTEM

(75) Inventors: Abtar Singh, Kennesaw, GA (US);
Paul Wickberg, Marietta, GA (US);
Neal Starling, Canton, GA (US);
Thomas J. Mathews, Fayette, ME (US)

(73) Assignee: Emerson Retail Services Inc., Kennesaw, GA (US)

( * ) Notice: Subject to any disclaimer, the term of this patent is extended or adjusted under 35 U.S.C. 154(b) by 0 days.

(21) Appl. No.: 10/675,137

(22) Filed: Sep. 30, 2003

(65) Prior Publication Data

US 2004/0060305 A1    Apr. 1, 2004

Related U.S. Application Data

(63) Continuation of application No. 10/132,663, filed on Apr. 25, 2002, now Pat. No. 6,675,591.

(60) Provisional application No. 60/288,551, filed on May 3, 2001.

(51) Int. Cl.
*F25B 49/00* (2006.01)
*G05D 23/00* (2006.01)
*F22B 37/00* (2006.01)
*G06F 15/00* (2006.01)
*G08B 17/00* (2006.01)

(52) U.S. Cl. ............................ 62/126; 236/51; 165/11.2; 702/182; 702/188; 340/585

(58) Field of Classification Search .................. 62/125, 62/126, 127, 129; 236/51; 165/11.1, 11.2; 702/130, 182, 188; 340/585
See application file for complete search history.

(56) References Cited

U.S. PATENT DOCUMENTS

| 5,181,389 | A |   | 1/1993  | Hanson et al.            |
|-----------|---|---|---------|--------------------------|
| 5,460,006 | A |   | 10/1995 | Torimitsu                |
| 5,743,109 | A | * | 4/1998  | Schulak ............ 62/428 |
| 5,875,430 | A |   | 2/1999  | Koether                  |
| 5,946,922 | A |   | 9/1999  | Viard et al.             |
| 6,098,893 | A | * | 8/2000  | Berglund et al. ...... 236/51 |

(Continued)

FOREIGN PATENT DOCUMENTS

EP    1 187 021 A2    3/2002

(Continued)

OTHER PUBLICATIONS

Pin Carmen, Baranyi Jozsef, Predictive Models as Means to Quantify the Interactions of Spoilage Organisms, International Journal of Food Microbiology, ol. 41, No. 1, 1998, pp. 59-72, XP-002285119.

*Primary Examiner*—Marc Norman
(74) *Attorney, Agent, or Firm*—Harness, Dickey & Pierce, P.L.C.

(57) ABSTRACT

A method of managing a refrigeration system includes transmitting energy consumption, maintenance indicator, and food condition data from the refrigeration system to a management center; analyzing the energy consumption, maintenance indicator, and food condition data at the management center; and monitoring, diagnosing and prognosing the performance of the refrigeration system in response to the analysis. The method may also include altering a configuration of the refrigeration system in response to the analysis. The refrigeration system may be located at a retail location and the management center may be located remotely to the retail location.

38 Claims, 35 Drawing Sheets

U.S. PATENT DOCUMENTS

| | | | |
|---|---|---|---|
| 6,215,405 B1 | 4/2001 | Handley et al. | |
| 6,393,848 B1 | 5/2002 | Roh et al. | |
| 6,397,606 B1 | 6/2002 | Roh et al. | |
| 6,453,687 B1 * | 9/2002 | Sharood et al. | 62/127 |
| 6,502,409 B1 * | 1/2003 | Gatling et al. | 62/80 |
| 6,526,766 B1 * | 3/2003 | Hiraoka et al. | 62/125 |
| 6,609,078 B1 | 8/2003 | Starling et al. | |
| 2001/0054291 A1 | 12/2001 | Roh et al. | |
| 2002/0000092 A1 | 1/2002 | Sharood et al. | |
| 2002/0029575 A1 | 3/2002 | Okamoto | |
| 2002/0082924 A1 | 6/2002 | Koether | |
| 2002/0118106 A1 * | 8/2002 | Brenn | 340/531 |
| 2002/0161545 A1 | 10/2002 | Starling et al. | |
| 2002/0163436 A1 * | 11/2002 | Singh et al. | 340/584 |

FOREIGN PATENT DOCUMENTS

| | | | |
|---|---|---|---|
| JP | 56-10639 | | 2/1981 |
| JP | 56010639 A | * | 2/1981 |
| WO | WO 02/14968 A1 | | 2/2002 |

* cited by examiner

| Ashrae Data for 72 Cities in Degrees F | | WORKING PAGE, DO NOT CHANGE | | | | | | | | | | | | |
|---|---|---|---|---|---|---|---|---|---|---|---|---|---|---|
| typical year through 1998 | | | | | | | | | | | | | | |
| Each bin range extends from the temperature shown to the bottom of the next higher range. The bottom and top bins are open ended eg. 126.5 to 99999 | | | | | | | | | | | | | | |
| # bins | 24 | ABEDMNTW.WY2 | | ALBIRMNW.WY2 | | ARLROCKW.WY2 | | AZPHNIXT.WY2 | | AZPHNIXW.WY2 | | BCVANCVW.WY2 | | CAFRESNT.WY2 |
| bin size | 7F | (Edmonton, Alberta) | | (Biminghia Alabama) | | (Little Rock,) | | (Phoenix, Arizona) | | (Phoenix, Arizona) | | (Vancouver British | | (Fresno, California) |
| top range | 127F | 53.55 | -86.75 | 33.57 | -86.75 | 34.73 | -92.23 | 33.43 | -112.02 | 33.43 | -112.02 | 49.2 | -123.18 | 36.77 | -119.72 |
| Month | Bin Temp | DryBulb | WetBulb | DryBulb | WetBulb | DryBulb | WetBulb | DryBulb | WetBulb | DryBulb | WetBulb | DryBulb | WetBulb | DryBulb | WetBulb |
| Jan | 126 | 0 | 0 | 0 | 0 | 0 | 0 | 0 | 0 | 0 | 0 | 0 | 0 | 0 | 0 |
| Jan | 120 | 0 | 0 | 0 | 0 | 0 | 0 | 0 | 0 | 0 | 2 | 0 | 0 | 0 | 0 |
| Jan | 113 | 0 | 0 | 0 | 0 | 0 | 0 | 0 | 0 | 0 | 0 | 0 | 0 | 0 | 0 |
| Jan | 107 | 0 | 0 | 0 | 0 | 0 | 0 | 0 | 0 | 0 | 0 | 0 | 0 | 0 | 0 |
| Jan | 100 | 0 | 0 | 0 | 0 | 0 | 0 | 0 | 1 | 0 | 0 | 0 | 0 | 0 | 0 |
| Jan | 94 | 0 | 0 | 0 | 0 | 0 | 0 | 0 | 0 | 0 | 0 | 0 | 0 | 0 | 0 |
| Jan | 87 | 0 | 0 | 0 | 0 | 0 | 0 | 0 | 0 | 0 | 0 | 0 | 0 | 0 | 0 |
| Jan | 81 | 0 | 0 | 0 | 0 | 0 | 0 | 0 | 0 | 0 | 0 | 0 | 0 | 0 | 0 |
| Jan | 74 | 0 | 0 | 0 | 0 | 0 | 0 | 0 | 1 | 3 | 1 | 0 | 0 | 0 | 0 |
| Jan | 68 | 0 | 0 | 0 | 0 | 4 | 0 | 27 | 4 | 45 | 5 | 0 | 2 | 1 | 0 |
| Jan | 61 | 0 | 10 | 37 | 17 | 51 | 16 | 113 | 17 | 108 | 4 | 0 | 0 | 47 | 5 |
| Jan | 55 | 0 | 45 | 115 | 57 | 71 | 63 | 178 | 151 | 134 | 95 | 52 | 16 | 103 | 0 |
| Jan | 48 | 0 | 114 | 148 | 82 | 52 | 46 | 160 | 151 | 131 | 317 | 208 | 122 | 304 | 14 |
| Jan | 42 | 0 | 149 | 133 | 154 | 142 | 86 | 145 | 304 | 213 | 198 | 161 | 219 | 196 | 288 |
| Jan | 35 | 8 | 134 | 107 | 143 | 126 | 154 | 92 | 202 | 71 | 82 | 135 | 120 | 84 | 323 |
| Jan | 29 | 24 | 79 | 78 | 117 | 108 | 137 | 29 | 61 | 25 | 34 | 153 | 186 | 9 | 99 |
| Jan | 22 | 85 | 121 | 82 | 112 | 100 | 113 | 0 | 1 | 14 | 6 | 35 | 78 | 0 | 15 |
| Jan | 16 | 70 | 52 | 37 | 54 | 64 | 89 | 0 | 0 | 0 | 0 | 0 | 1 | 0 | 0 |
| Jan | 9 | 69 | 39 | 7 | 8 | 26 | 33 | 0 | 0 | 0 | 0 | 0 | 0 | 0 | 0 |
| Jan | 3 | 72 | 1 | 0 | 0 | 0 | 7 | 0 | 1 | 0 | 0 | 0 | 0 | 0 | 0 |
| Jan | -4 | 84 | 0 | 0 | 0 | 0 | 0 | 0 | 0 | 0 | 0 | 0 | 0 | 0 | 0 |
| Jan | -10 | 184 | 0 | 0 | 0 | 0 | 0 | 0 | 0 | 0 | 0 | 0 | 0 | 0 | 0 |
| Jan | -17 | 63 | 0 | 0 | 0 | 0 | 0 | 0 | 0 | 0 | 0 | 0 | 0 | 0 | 0 |
| Jan | -23 | 85 | 0 | 0 | 0 | 0 | 0 | 0 | 0 | 0 | 0 | 0 | 0 | 0 | 0 |
| Feb | 126 | 0 | 0 | 0 | 0 | 0 | 0 | 0 | 0 | 0 | 0 | 0 | 0 | 0 | 0 |
| Feb | 120 | 0 | 0 | 0 | 0 | 0 | 0 | 0 | 0 | 0 | 0 | 0 | 0 | 0 | 0 |
| Feb | 113 | 0 | 0 | 0 | 0 | 0 | 0 | 0 | 0 | 0 | 0 | 0 | 0 | 0 | 0 |
| Feb | 107 | 0 | 0 | 0 | 0 | 0 | 0 | 0 | 0 | 0 | 0 | 0 | 0 | 0 | 0 |
| Feb | 100 | 0 | 0 | 4 | 0 | 0 | 0 | 2 | 0 | 3 | 0 | 0 | 0 | 0 | 0 |
| Feb | 94 | 0 | 0 | 19 | 0 | 15 | 3 | 13 | 2 | 8 | 1 | 0 | 0 | 1 | 1 |
| Feb | 87 | 0 | 4 | 92 | 71 | 33 | 13 | 52 | 1 | 65 | 0 | 0 | 1 | 10 | 42 |
| Feb | 81 | 0 | 71 | 106 | 73 | 54 | 33 | 105 | 6 | 91 | 88 | 0 | 0 | 41 | 185 |
| Feb | 74 | 0 | 77 | 90 | 53 | 89 | 72 | 141 | 115 | 166 | 169 | 18 | 167 | 108 | 275 |
| Feb | 68 | 0 | 156 | 125 | 130 | 206 | 139 | 130 | 294 | 152 | 246 | 313 | 376 | 224 | 105 |
| Feb | 61 | 22 | 99 | 73 | 122 | 104 | 179 | 156 | 201 | 152 | 152 | 244 | 122 | 170 | 58 |
| Feb | 55 | 73 | 101 | 99 | 100 | 101 | 121 | 68 | 47 | 28 | 15 | 92 | | 74 | |
| Feb | 48 | | | | | | | 5 | | 7 | | | | 44 | |
| Feb | 42 | | | | | | | | | | | | | | |
| Feb | 35 | | | | | | | | | | | | | | |
| Feb | 29 | | | | | | | | | | | | | | |

*Figure 11*

DO NOT CHANGE.... THIS PAGE IS POSITION DEPENDENT AND USED TO IMPORT NEW ASHRAE DATA !!!!

WYEC-2 site  NMALBUQW.WY2  (Albuquerque, New Mexico)
Latitude: 35.05  Longitude: -106.62 quantity  WYEC2 wetbulb

| | | | | | | | | | | | | |
|---|---|---|---|---|---|---|---|---|---|---|---|---|
| 0 | 0 | 0 | 2 | 22 | 80 | 248 | 270 | 120 | 2 | 0 | 0 | 0 | 0 | 0 | 0 | 0 | 0 | 0 | 0 | 744 |
| 0 | 0 | 0 | 0 | 43 | 42 | 116 | 156 | 204 | 99 | 9 | 0 | 0 | 0 | 0 | 0 | 0 | 0 | 0 | 0 | 672 |
| 0 | 0 | 0 | 3 | 0 | 14 | 143 | 232 | 255 | 96 | 0 | 3 | 0 | 0 | 0 | 0 | 0 | 0 | 0 | 0 | 744 |
| 3 | 0 | 1 | 0 | 2 | 2 | 41 | 115 | 228 | 232 | 83 | 10 | 1 | 0 | 2 | 0 | 0 | 0 | 0 | 0 | 720 |
| 5 | 0 | 2 | 0 | 0 | 0 | 1 | 21 | 89 | 283 | 263 | 71 | 6 | 1 | 1 | 0 | 0 | 2 | 0 | 0 | 744 |
| 1 | 0 | 2 | 0 | 0 | 0 | 0 | 5 | 23 | 134 | 199 | 268 | 81 | 0 | 2 | 1 | 0 | 2 | 0 | 0 | 720 |
| 0 | 0 | 0 | 0 | 0 | 0 | 4 | 0 | 0 | 6 | 12 | 382 | 318 | 19 | 0 | 2 | 1 | 0 | 0 | 0 | 744 |
| 0 | 0 | 2 | 0 | 0 | 0 | 1 | 1 | 2 | 20 | 82 | 280 | 343 | 14 | 0 | 0 | 0 | 0 | 0 | 0 | 744 |
| 1 | 0 | 0 | 0 | 0 | 0 | 0 | 4 | 13 | 158 | 218 | 300 | 20 | 0 | 1 | 0 | 0 | 0 | 0 | 0 | 720 |
| 0 | 0 | 2 | 1 | 7 | 37 | 147 | 198 | 89 | 276 | 265 | 103 | 6 | 0 | 0 | 0 | 0 | 0 | 0 | 0 | 744 |
| 2 | 0 | 0 | 3 | 28 | 62 | 210 | 195 | 172 | 141 | 12 | 0 | 1 | 0 | 0 | 0 | 0 | 0 | 0 | 0 | 720 |
| 0 | 0 | 0 | 9 | 102 | 237 | 913 | 1201 | 1404 | 1484 | 1143 | 1414 | 780 | 33 | 4 | 4 | 1 | 0 | 0 | 6 | 744 |
| 12 | 0 | 9 | 9 | | | | | | | | | | | | | | | | 4 | 8760 |

| kwmonth | ACTUAL DAY BY DAY, HOUR BY HOUR DATA<br>Data must be sorted by date and hour | | | | | | ACTUAL DAY BY DAY, HOUR BY HOUR DATA FOR 24 HOUR PERIOD | | | | | |
|---|---|---|---|---|---|---|---|---|---|---|---|---|
| | kwdate | kwhour | temp | kwuselt | kwusemt | Storepop | kwdate | kwhour | temp | kwuselt | kwusemt | Storepop |
| 1 | 01/18/01 | 1.0 | 44.8 | 40.8 | 43.0 | 2.0 | 01/18/01 | 1 | 39 | 39 | 43 | 2 |
| 1 | 01/18/01 | 2.0 | 44.8 | 40.8 | 43.0 | 2.0 | 01/18/01 | 2 | 39 | 39 | 43 | 2 |
| 1 | 01/18/01 | 3.0 | 44.8 | 40.8 | 43.0 | 2.0 | 01/18/01 | 3 | 39 | 39 | 43 | 2 |
| 1 | 01/18/01 | 4.0 | 44.8 | 40.8 | 43.0 | 2.0 | 01/18/01 | 4 | 39 | 39 | 43 | 2 |
| 1 | 01/18/01 | 5.0 | 44.8 | 40.8 | 43.0 | 2.0 | 01/18/01 | 5 | 39 | 39 | 43 | 2 |
| 1 | 01/18/01 | 6.0 | 44.8 | 40.8 | 43.0 | 2.0 | 01/18/01 | 6 | 39 | 39 | 43 | 2 |
| 1 | 01/18/01 | 7.0 | 44.8 | 40.8 | 43.0 | 2.0 | 01/18/01 | 7 | 39 | 39 | 43 | 2 |
| 1 | 01/18/01 | 8.0 | 44.8 | 40.8 | 43.0 | 2.0 | 01/18/01 | 8 | 39 | 39 | 43 | 2 |
| 1 | 01/18/01 | 9.0 | 44.8 | 40.8 | 43.0 | 2.0 | 01/18/01 | 9 | 39 | 39 | 43 | 2 |
| 1 | 01/18/01 | 10.0 | 44.8 | 40.8 | 43.0 | 2.0 | 01/18/01 | 10 | 39 | 39 | 43 | 2 |
| 1 | 01/18/01 | 11.0 | 44.8 | 40.8 | 43.0 | 2.0 | 01/18/01 | 11 | 39 | 39 | 43 | 2 |
| 1 | 01/18/01 | 12.0 | 44.8 | 40.8 | 43.0 | 2.0 | 01/18/01 | 12 | 39 | 39 | 43 | 2 |
| 1 | 01/18/01 | 13.0 | 44.8 | 40.8 | 43.0 | 2.0 | 01/18/01 | 13 | 39 | 39 | 43 | 2 |
| 1 | 01/18/01 | 14.0 | 44.8 | 40.8 | 43.0 | 2.0 | 01/18/01 | 14 | 39 | 39 | 43 | 2 |
| 1 | 01/18/01 | 15.0 | 44.8 | 40.8 | 43.0 | 2.0 | 01/18/01 | 15 | 39 | 39 | 43 | 2 |
| 1 | 01/18/01 | 16.0 | 44.8 | 40.8 | 43.0 | 2.0 | 01/18/01 | 16 | 39 | 39 | 43 | 2 |
| 1 | 01/18/01 | 17.0 | 44.8 | 40.8 | 43.0 | 2.0 | 01/18/01 | 17 | 39 | 39 | 43 | 2 |
| 1 | 01/18/01 | 18.0 | 44.8 | 40.8 | 43.0 | 2.0 | 01/18/01 | 18 | 39 | 39 | 43 | 2 |
| 1 | 01/18/01 | 19.0 | 44.8 | 40.8 | 43.0 | 2.0 | 01/18/01 | 19 | 39 | 39 | 43 | 2 |
| 1 | 01/18/01 | 20.0 | 44.8 | 40.8 | 43.0 | 2.0 | 01/18/01 | 20 | 39 | 39 | 43 | 2 |
| 1 | 01/18/01 | 21.0 | 44.8 | 40.8 | 43.0 | 2.0 | 01/18/01 | 21 | 39 | 39 | 43 | 2 |
| 1 | 01/18/01 | 22.0 | 44.8 | 40.8 | 43.0 | 2.0 | 01/18/01 | 22 | 39 | 39 | 43 | 2 |
| 1 | 01/18/01 | 23.0 | 44.8 | 40.8 | 43.0 | 2.0 | 01/18/01 | 23 | 39 | 39 | 43 | 2 |
| 1 | 01/18/01 | 0.0 | 44.8 | 40.8 | 43.0 | 2.0 | 01/19/01 | 0 | 39 | 16 | 42 | 2 |

*Figure 16*

GENERAL MODEL CALCULATIONS
LOW and MEDIUM TEMP RACK kWh Use for Each Bin Hour

| Amb Temp | Cond T Temp | Subcooler T Tin | Subcooler T Tout | Suct T: -25F Base Load: 281,332 Comp Eff: 65% s.c. load | comp load | Comp KW | Suct T: -35F Base Load: 13,580 Comp Eff: 65% s.c. load | comp load | Comp KW | Suct T: 15F Base Load: Comp Eff: 65% s.c. load | comp load | Comp KW | Total Comp KW | Heat of Rejection (Btu/hr) | Condenser Calculations req. cap. | fan kW | Annual Energy Comp kWh | Annual Energy Cond kWh | Total kWh |
|---|---|---|---|---|---|---|---|---|---|---|---|---|---|---|---|---|---|---|---|
| -25 | 55.5285 | 40.5 | 40.5 | - | 281,332 | 27.76 | - | 13,580 | 1.53 | - | - | - | 29.34 | 395,006 | 27% | 0.35 | 29 | 0.35 | 30 |
| -24 | 55.5285 | 40.5 | 40.5 | - | 281,332 | 27.76 | - | 13,580 | 1.58 | - | - | - | 29.34 | 395,006 | 28% | 0.35 | 29 | 0.35 | 30 |
| -23 | 55.5285 | 40.5 | 40.5 | - | 281,332 | 27.76 | - | 13,580 | 1.58 | - | - | - | 29.34 | 395,006 | 28% | 0.35 | 29 | 0.35 | 30 |
| -22 | 55.5285 | 40.5 | 40.5 | - | 281,332 | 27.76 | - | 13,580 | 1.58 | - | - | - | 29.34 | 395,006 | 28% | 0.36 | 29 | 0.36 | 30 |
| -21 | 55.5285 | 40.5 | 40.5 | - | 281,332 | 27.76 | - | 13,580 | 1.58 | - | - | - | 29.34 | 395,006 | 29% | 0.36 | 29 | 0.36 | 30 |
| -20 | 55.5285 | 40.5 | 40.5 | - | 281,332 | 27.76 | - | 13,580 | 1.58 | - | - | - | 29.34 | 395,006 | 29% | 0.37 | 29 | 0.37 | 30 |
| -19 | 55.5285 | 40.5 | 40.5 | - | 281,332 | 27.76 | - | 13,580 | 1.58 | - | - | - | 29.34 | 395,006 | 29% | 0.37 | 29 | 0.37 | 30 |
| -18 | 55.5285 | 40.5 | 40.5 | - | 281,332 | 27.76 | - | 13,580 | 1.58 | - | - | - | 29.34 | 395,006 | 30% | 0.38 | 29 | 0.38 | 30 |
| -17 | 55.5285 | 40.5 | 40.5 | - | 281,332 | 27.76 | - | 13,580 | 1.58 | - | - | - | 29.34 | 395,006 | 30% | 0.38 | 29 | 0.38 | 30 |
| -16 | 55.5285 | 40.5 | 40.5 | - | 281,332 | 27.76 | - | 13,580 | 1.58 | - | - | - | 29.34 | 395,006 | 31% | 0.39 | 29 | 0.39 | 30 |
| -15 | 55.5285 | 40.5 | 40.5 | - | 281,332 | 27.76 | - | 13,580 | 1.58 | - | - | - | 29.34 | 395,006 | 31% | 0.39 | 29 | 0.39 | 30 |
| -14 | 55.5285 | 40.5 | 40.5 | - | 281,332 | 27.76 | - | 13,580 | 1.58 | - | - | - | 29.34 | 395,006 | 32% | 0.40 | 29 | 0.40 | 30 |
| -13 | 55.5285 | 40.5 | 40.5 | - | 281,332 | 27.76 | - | 13,580 | 1.58 | - | - | - | 29.34 | 395,006 | 32% | 0.41 | 29 | 0.41 | 30 |
| -12 | 55.5285 | 40.5 | 40.5 | - | 281,332 | 27.76 | - | 13,580 | 1.58 | - | - | - | 29.34 | 395,006 | 32% | 0.41 | 29 | 0.41 | 30 |
| -11 | 55.5285 | 40.5 | 40.5 | - | 281,332 | 27.76 | - | 13,580 | 1.58 | - | - | - | 29.34 | 395,006 | 33% | 0.42 | 29 | 0.42 | 30 |
| -10 | 55.5285 | 40.5 | 40.5 | - | 281,332 | 27.76 | - | 13,580 | 1.58 | - | - | - | 29.34 | 395,006 | 33% | 0.42 | 29 | 0.42 | 30 |
| -9 | 55.5285 | 40.5 | 40.5 | - | 281,332 | 27.76 | - | 13,580 | 1.58 | - | - | - | 29.34 | 395,006 | 34% | 0.43 | 29 | 0.43 | 30 |
| -8 | 55.5285 | 40.5 | 40.5 | - | 281,332 | 27.76 | - | 13,580 | 1.58 | - | - | - | 29.34 | 395,006 | 35% | 0.44 | 29 | 0.44 | 30 |
| -7 | 55.5285 | 40.5 | 40.5 | - | 281,332 | 27.76 | - | 13,580 | 1.58 | - | - | - | 29.34 | 395,006 | 35% | 0.45 | 29 | 0.45 | 30 |
| -6 | 55.5285 | 40.5 | 40.5 | - | 281,332 | 27.76 | - | 13,580 | 1.58 | - | - | - | 29.34 | 395,006 | 36% | 0.45 | 29 | 0.45 | 30 |
| -5 | 55.5285 | 40.5 | 40.5 | - | 281,332 | 27.76 | - | 13,580 | 1.58 | - | - | - | 29.34 | 395,006 | 36% | 0.46 | 29 | 0.46 | 30 |
| -4 | 55.5285 | 40.5 | 40.5 | - | 281,332 | 27.76 | - | 13,580 | 1.58 | - | - | - | 29.34 | 395,006 | 37% | 0.47 | 29 | 0.47 | 30 |
| -3 | 55.5285 | 40.5 | 40.5 | - | 281,332 | 27.76 | - | 13,580 | 1.58 | - | - | - | 29.34 | 395,006 | 37% | 0.48 | 29 | 0.48 | 30 |
| -2 | 55.5285 | 40.5 | 40.5 | - | 281,332 | 27.76 | - | 13,580 | 1.58 | - | - | - | 29.34 | 395,006 | 38% | 0.48 | 29 | 0.48 | 30 |
| -1 | 55.5285 | 40.5 | 40.5 | - | 281,332 | 27.76 | - | 13,580 | 1.58 | - | - | - | 29.34 | 395,006 | 39% | 0.49 | 29 | 0.49 | 30 |
| 0 | 55.5285 | 40.5 | 40.5 | - | 281,332 | 27.76 | - | 13,580 | 1.58 | - | - | - | 29.34 | 395,006 | 40% | 0.50 | 29 | 0.50 | 30 |
| 1 | 55.5285 | 40.5 | 40.5 | - | 281,332 | 27.76 | - | 13,580 | 1.58 | - | - | - | 29.34 | 395,006 | 40% | 0.51 | 29 | 0.51 | 30 |
| 2 | 55.5285 | 40.5 | 40.5 | - | 281,332 | 27.76 | - | 13,580 | 1.58 | - | - | - | 29.34 | 395,006 | 41% | 0.52 | 29 | 0.52 | 30 |
| 3 | 55.5285 | 40.5 | 40.5 | - | 281,332 | 27.76 | - | 13,580 | 1.58 | - | - | - | 29.34 | 395,006 | 42% | 0.53 | 29 | 0.53 | 30 |
| 4 | 55.5285 | 40.5 | 40.5 | - | 281,332 | 27.76 | - | 13,580 | 1.58 | - | - | - | 29.34 | 395,006 | 43% | 0.54 | 29 | 0.54 | 30 |
| 5 | 55.5285 | 40.5 | 40.5 | - | 281,332 | 27.76 | - | 13,580 | 1.58 | - | - | - | 29.34 | 395,006 | 43% | 0.55 | 29 | 0.55 | 30 |
| 6 | 55.5285 | 40.5 | 40.5 | - | 281,332 | 27.76 | - | 13,580 | 1.58 | - | - | - | 29.34 | 395,006 | 44% | 0.56 | 29 | 0.56 | 30 |
| 7 | 55.5285 | 40.5 | 40.5 | - | 281,332 | 27.76 | - | 13,580 | 1.58 | - | - | - | 29.34 | 395,006 | 45% | 0.57 | 29 | 0.57 | 30 |
| 8 | 55.5285 | 40.5 | 40.5 | - | 281,332 | 27.76 | - | 13,580 | 1.58 | - | - | - | 29.34 | 395,006 | 46% | 0.59 | 29 | 0.59 | 30 |
| 9 | 55.5285 | 40.5 | 40.5 | - | 281,332 | 27.76 | - | 13,580 | 1.58 | - | - | - | 29.34 | 395,006 | 47% | 0.60 | 29 | 0.60 | 30 |
| 10 | 55.5285 | 40.5 | 40.5 | - | 281,332 | 27.76 | - | 13,580 | 1.58 | - | - | - | 29.34 | 395,006 | 48% | 0.61 | 29 | 0.61 | 30 |
| 11 | 55.5285 | 40.5 | 40.5 | - | 281,332 | 27.76 | - | 13,580 | 1.58 | - | - | - | 29.34 | 395,006 | 49% | 0.63 | 29 | 0.63 | 30 |
| 12 | 55.5285 | 40.5 | 40.5 | - | 281,332 | 27.76 | - | 13,580 | 1.58 | - | - | - | 29.34 | 395,006 | 50% | 0.64 | 29 | 0.64 | 30 |
| 13 | 55.5285 | 40.5 | 40.5 | - | 281,332 | 27.76 | - | 13,580 | 1.58 | - | - | - | 29.34 | 395,006 | 52% | 0.65 | 29 | 0.65 | 30 |
| 14 | 55.5285 | 40.5 | 40.5 | - | 281,332 | 27.76 | - | 13,580 | 1.58 | - | - | - | 29.34 | 395,006 | 53% | 0.67 | 29 | 0.67 | 30 |
| 15 | 55.5285 | 40.5 | 40.5 | - | 281,332 | 27.76 | - | 13,580 | 1.58 | - | - | - | 29.34 | 395,006 | 54% | 0.69 | 29 | 0.69 | 30 |

POWER MONITORING TOOL — actual versus projected use

Enter Beginning Day and Hour to start 24 hour summary
Monthly data will begin on the specified date and run for 31 days
Yearly data will be accumulated by actual month STORE NAME
Beginning Day
Beginning Hour (0-23)
Date Index ... calculated, do not enter Click to Update Date and Time Comparison Charts available on next page

| #22 - MONTHLY SUMMARY | |
|---|---|
| LOW TEMP RACK | |
| Actual kWh Use | 14,938 |
| Projected kWh Use | 12,463 |
| Difference | 2,475 |
| % Over/Under(-) Proj | 19.9% |
| MEDIUM TEMP RACK | |
| Actual kWh Use | 15,840 |
| Projected kWh Use | 9,682 |
| Difference | 6,158 |
| % Over/Under(-) Proj | 63.6% |
| BOTH LOW AND MEDIUM | |
| Actual kWh Use | 30,778 |
| Projected kWh Use | 22,145 |
| Difference | 8,633 |
| % Over/Under(-) Proj | 39.0% |

ACTUAL HOURLY DATA for selected day

| Time of Day | Ambient Temp | Occupancy Factor | Low Temp Rack Total kWh | Medium Temp Rack Total kWh | Total kWh | Low Temp Rack Total kWh | Medium Temp Rack Total kWh | Total kWh |
|---|---|---|---|---|---|---|---|---|
| 1 | 45 | | 33,825 | 25,120 | 58,945 | 40,381 | 41,500 | 81,881 |
| 2 | 44 | | 33,334 | 24,450 | 57,784 | 40,769 | 43,000 | 83,769 |
| 3 | 44 | | 33,334 | 24,450 | 57,784 | 40,769 | 43,000 | 83,769 |
| 4 | 44 | | 33,334 | 24,450 | 57,784 | 40,769 | 43,000 | 83,769 |
| 5 | 44 | | 33,334 | 24,450 | 57,784 | 40,769 | 43,000 | 83,769 |
| 6 | 44 | | 33,334 | 24,450 | 57,784 | 40,769 | 43,000 | 83,769 |
| 7 | 44 | | 33,334 | 24,450 | 57,784 | 40,769 | 43,000 | 83,769 |
| 8 | 44 | | 33,334 | 24,450 | 57,784 | 40,769 | 43,000 | 83,769 |
| 9 | 44 | | 33,334 | 24,450 | 57,784 | 40,769 | 43,000 | 83,769 |
| 10 | 44 | | 33,334 | 24,450 | 57,784 | 40,769 | 43,000 | 83,769 |
| 11 | 44 | | 33,334 | 24,450 | 57,784 | 40,769 | 43,000 | 83,769 |
| 12 | 44 | | 33,334 | 24,450 | 57,784 | 40,769 | 43,000 | 83,769 |
| 13 | 44 | | 33,334 | 24,450 | 57,784 | 40,769 | 43,000 | 83,769 |
| 14 | 44 | | 33,334 | 24,450 | 57,784 | 40,769 | 43,000 | 83,769 |
| 15 | 44 | | 33,334 | 24,450 | 57,784 | 40,769 | 43,000 | 83,769 |
| 16 | 44 | | 33,334 | 24,450 | 57,784 | 40,769 | 43,000 | 83,769 |
| 17 | 44 | | 33,334 | 24,450 | 57,784 | 40,769 | 43,000 | 83,769 |
| 18 | 44 | | 33,334 | 24,450 | 57,784 | 40,769 | 43,000 | 83,769 |
| 19 | 44 | | 33,334 | 24,450 | 57,784 | 40,769 | 43,000 | 83,769 |

COMPARISON

| Low Temp Rack Over Est kWh | | Medium Temp Rack Over Est kWh | | Hrly Total Over Est kWh | | Running Tot Over Est kWh | |
|---|---|---|---|---|---|---|---|
| 6,556 | 19.4% | 16,380 | 65.2% | 22,936 | 38.9% | 22,936 | 38.9% |
| 7,435 | 22.3% | 18,550 | 75.9% | 25,985 | 45.0% | 48,921 | 41.9% |
| 7,435 | 22.3% | 18,550 | 75.9% | 25,985 | 45.0% | 74,906 | 42.9% |
| 7,435 | 22.3% | 18,550 | 75.9% | 25,985 | 45.0% | 100.89 | 43.4% |
| 7,435 | 22.3% | 18,550 | 75.9% | 25,985 | 45.0% | 126,875 | 43.7% |
| 7,435 | 22.3% | 18,550 | 75.9% | 25,985 | 45.0% | 152.86 | 43.9% |
| 7,435 | 22.3% | 18,550 | 75.9% | 25,985 | 45.0% | 178,844 | 44.1% |
| 7,435 | 22.3% | 18,550 | 75.9% | 25,985 | 45.0% | 204,829 | 44.2% |
| 7,435 | 22.3% | 18,550 | 75.9% | 25,985 | 45.0% | 230,814 | 44.3% |
| 7,435 | 22.3% | 18,550 | 75.9% | 25,985 | 45.0% | 256,798 | 44.4% |
| 7,435 | 22.3% | 18,550 | 75.9% | 25,985 | 45.0% | 282,783 | 44.4% |
| 7,435 | 22.3% | 18,550 | 75.9% | 25,985 | 45.0% | 308,767 | 44.5% |
| 7,435 | 22.3% | 18,550 | 75.9% | 25,985 | 45.0% | 334,752 | 44.5% |
| 7,435 | 22.3% | 18,550 | 75.9% | 25,985 | 45.0% | 360,737 | 44.5% |
| 7,435 | 22.3% | 18,550 | 75.9% | 25,985 | 45.0% | 386,721 | 44.6% |
| 7,435 | 22.3% | 18,550 | 75.9% | 25,985 | 45.0% | 412,706 | 44.6% |
| 7,435 | 22.3% | 18,550 | 75.9% | 25,985 | 45.0% | 438,691 | 44.6% |
| 7,435 | 22.3% | 18,550 | 75.9% | 25,985 | 45.0% | 464,675 | 44.6% |
| 7,435 | 122.3% | 19,550 | 75.9% | 25,985 | 45.0% | 490.66 | 44.6% |

Figure 20

DESIGN TOOL SETUP

AZPHNIXT (Phoenix)     STORE: #22     Period All

Select Scenario, Enter Specifications Below, and Save Scenario

| # | Scenario | | |
|---|---|---|---|
| #1 | BASE CASE - - High cond temp -LT Rack 2/4/01 | 807.550 kW | |
| #2 | RETROFIT CAS - Rev Disch and Suct Press 2/4/01 | 769.018 | |
| #3 | BASE CASE - - No Subcooler 3/10/01 | 1,125,150 kWh | |
| #4 | is available | | |
| #5 | is available | | |
| #6 | is available | | |
| #7 | is available | | |
| #8 | is available | | |
| #9 | is available | | |
| #10 | is available | | |

○ Save    ○ Delete    ○ Retrieve

CURRENT SCENARIO

| | |
|---|---|
| Scenario | Retrofit Case |
| Comment | Rev Disch and Suct Press |
| Date | 2/4/2001 |
| Scenario# | 2 |
| Period | All |

*Enter items in "bold" above, before saving scenario*

LOW to MEDIUM TEMP RACK

| Comp/Evap. Spec. | | Suction #1 | | -25F | Loads | Suction #2 | | -35F | Loads | Suction #3 | | 15F | Loads |
|---|---|---|---|---|---|---|---|---|---|---|---|---|---|
| Refrigerant | R-507 | Cut-in: | | 14.0psig | -25.5F | Cut-in: | | 8.0psig | -35.3F | Cut-in: | | 52.0psig | 14.8F |
| Superheat | 25F | Cut-out: | | 14.0psig | -25.5F | Cut-out: | | 8.0psig | -35.3F | Cut-out: | | 52.0psig | 14.8F |
| Min. cond. temp. | 55.5F | Avg suction | | | -25.5F | Avg suction | | | -35.3F | Avg suction | | | 14.8F |
| Condenser cut-out: | 120.0psig | Comp Eff | | | 65% | Comp Eff | | | 65% | Comp Eff | | | 65% |
| Subcooler Characteristics | | Total design load | | | 281,332 | Total design load | | | 13,580 | Total design load | | | - |
| Subcooler? | y | Diversity factor | | | 100% | Diversity factor | | | 100% | Diversity factor | | | 85% |
| Dropleg cutout temp | 50F | Actual load | | | 281,332 | Actual load | | | 13,580 | Actual load | | | - |
| Fluid temp out | 50F | | | | | | | | | | | | |

| Condenser Characteristics | | | RACKS | BTU/hr | Compr | Cond | Total |
|---|---|---|---|---|---|---|---|
| Capacity | 18,000 | Btu/hr-F | LowTemp | 294,912 | 350,372 | 12,080 | 362,452 |
| Fan Power | 2 | hp | HghTemp | 615,221 | 376,987 | 29,580 | 406,567 |
| Actual Fan Power | 85% | | Total | 910,133 | 727,359 | 41,660 | 769,019 |
| Select TD type below | | | | | *taken from Design Tool Results* | | | |
| fan cycling or variable speed | fan cycling | | | | | | | |
| Condenser TD | 20F | | | | | | | |
| Amb. Subcooling | 15F | | | | | | | |
| hp/cap = | 1/3 | 2/3 | | | | | | |
| %hp = (%cap)^ | 2.71 | | | | | | | |

*Figure 22*

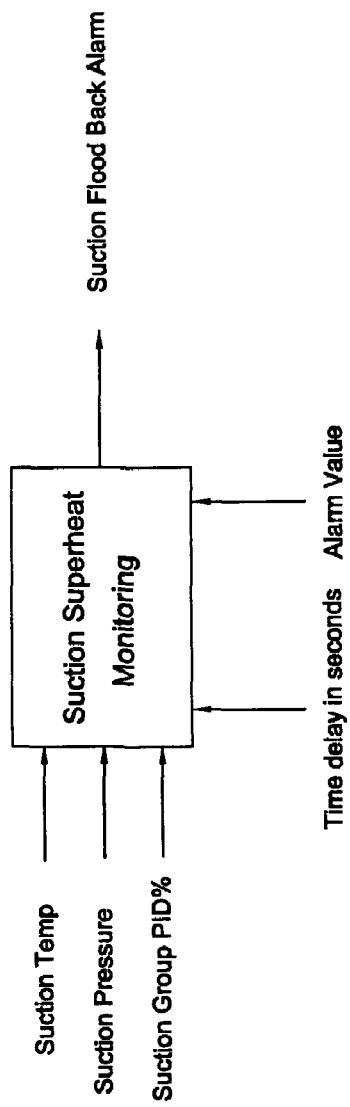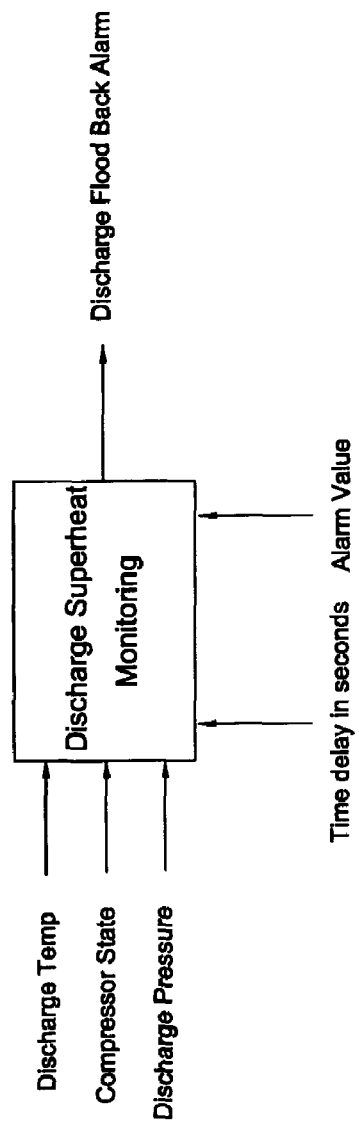

Actions

| | Maintenance Advisory: Non-emergency repair | Maintenance Advisory: Maintenance review remotely and respond as necessary | Store Advisory: Store advised to manually check product temperatures, Maintenance Advisory: Non-emergency repair | Maintenance Alarm: Immediate action required. Store Advisory: advise manually check of product temperatures | Maintenance Advisory: Review remotely and respond as necessary | Store Advisory: Store advised to inspect / correct per procedures; Call maintenance if cannot resolve | Store Alarm: Store must check product temperatures and condition; remove to other refrigerated storage as reqd. | Store Alarm: Store must immediately inspect product in affected fixture; remove product per date code limits | Store Emergency: Store must immediately remove and discard product per date code limits from affected fixture(s) |
|---|---|---|---|---|---|---|---|---|---|
| Prod Temp. Cycling | | | | | X | | | | |
| Pathogen Count Exceeded | | | | | | | | | X |
| Spoiler Count Exceeded | | | | | | | | X | |
| Prod FDA Time-Temp Exceeded | | | | | | | X | | |
| Prod Degree-Min. Exceeded | | | | | | X | | | |
| Prod Time-Temp. Exceeded | | | | | | X | | | |
| Disc. Air Degree-Min Exceed | | | | | | | | | |
| Disc. Air Time-Temp. Exceeded | | X | | | | | | | |
| Prod. Temp. Sensor Failed | | | X | X | | | | | |
| Disc. Air Temp. Sensor Failed | X | | | X | | | | | |

*Figure 32*

METHOD OF MANAGING A REFRIGERATION SYSTEM

CROSS-REFERENCE TO RELATED APPLICATIONS

This application is a continuation of U.S. patent application Ser. No. 10/132,663 filed on Apr. 25, 2002, now U.S. Pat. No. 6,675,591, which claims the benefit of U.S. Provisional Application No. 60/288,551 filed on May 3, 2001. The disclosures of the above applications are incorporated herein by reference.

FIELD OF THE INVENTION

The present invention relates to managing a refrigeration system and, more particularly, to monitoring and evaluating food inventory and equipment of a food retailer.

BACKGROUND OF THE INVENTION

Produced food travels from processing plants to retailers, where the food product remains on display case shelves for extended periods of time. In general, the display case shelves are part of a refrigeration system for storing the food product. In the interest of efficiency, retailers attempt to maximize the shelf-life of the stored food product while maintaining awareness of food product quality and safety issues.

For improved food quality and safety, the food product should not exceed critical temperature limits while being displayed in the grocery store display cases. For uncooked food products, the product temperature should not exceed forty-one (41) degrees Fahrenheit. Above this critical temperature limit, bacteria grow at a faster rate. In order to maximize the shelf life and safety of the food product, retailers must carefully monitor the food product stored therein. In general, monitoring of the temperature of the food product enables determination of the bacterial growth rates of the food product. To achieve this, refrigeration systems of retailers typically include temperature sensors within the individual refrigeration units. These temperature sensors feed the temperature information to a refrigeration system controller. Monitoring of the food product involves information gathering and analysis.

The refrigeration system plays a key role in controlling the quality and safety of the food product. Thus, any breakdown in the refrigeration system or variation in performance of the refrigeration system can cause food quality and safety issues. Thus, it is important for the retailer to monitor and maintain the equipment of the refrigeration system to ensure its operation at expected levels.

Further, refrigeration systems generally require a significant amount of energy to operate. The energy requirements are thus a significant cost to food product retailers, especially when compounding the energy uses across multiple retail locations. As a result, it is in the best interest of food retailers to closely monitor the performance of the refrigeration systems to maximize their efficiency, thereby reducing operational costs.

Monitoring food product quality and safety, as well as refrigeration system performance, maintenance and energy consumption are tedious and time-consuming operations and are undesirable for retailers to perform independently. Generally speaking, retailers lack the expertise to accurately analyze time and temperature data and relate that data to food product quality and safety, as well as the expertise to monitor the refrigeration system for performance, maintenance and efficiency. Further, a typical food retailer includes a plurality of retail locations spanning a large area. Monitoring each of the retail locations on an individual basis is inefficient and often results in redundancies.

Therefore, it is desirable in the industry to provide a method for monitoring the food product of a plurality of remote retailers. The method should allow a user to accurately determine the quality and safety of the food product as a function of the temperature history and length of time stored. Further, the method should provide an alarming routine for signaling when the food product has crossed particular quality and safety limits. The method should also monitor the refrigeration systems of the remote retailers for performance, maintenance and efficiency. The method should monitor multiple locations for performance comparison purposes, to avoid redundancies between remote locations and to provide the expertise required to accurately analyze characteristics of individual remote locations.

SUMMARY OF THE INVENTION

Accordingly, the present invention provides a method for monitoring and managing a refrigeration system of a remote location. The method includes a communication network and a management center in communication with the remote location through the communication network. The management center receives information from the remote location regarding performance of the refrigeration system, whereby the management center analyzes and evaluates the information for altering operation of the refrigeration system thereby improving the performance.

A method of managing a refrigeration system generally includes transmitting energy consumption, maintenance indicator, and food condition data from the refrigeration system to a management center; analyzing the energy consumption, maintenance indicator, and food condition data at the management center; and monitoring, diagnosing and prognosing the performance of the refrigeration system in response to the analysis. The method may include altering a configuration or altering manipulation of the refrigeration system in response to the analysis. The refrigeration system may be at retail location while the management center is at a remote location.

Further, the analysis of the said food condition data includes calculating a food quality index or a food safety index. The method may include alarming as a function of the food quality index or the food safety index.

The analysis of the energy consumption data may include analyzing weather data, wherein the weather data is historical weather data or actual weather data. Analysis of the maintenance indicator data may include analyzing condenser condition data, analyzing compressor condition data, analyzing liquid refrigerant flood back data, analyzing relay output data, analyzing contactor count data, analyzing compressor run-time data, analyzing oil check data, analyzing air filter data, or analyzing light bulb change data. The method may include outputting a work order in response to the analysis. Transmitting includes transmitting through a communication gateway to said management center, and may include post-processing the data at the communication gateway.

BRIEF DESCRIPTION OF THE DRAWINGS

The present invention will become more fully understood from the detailed description and the accompanying drawings, wherein:

FIG. 11 is a screen-shot of a temperature data sheet used in conjunction with the energy usage algorithm;

FIG. 13 is a screen-shot of a temperature data import sheet;

FIG. 15 is a screen-shot of a store specification component of the actual site data routine;

FIG. 16 is a screen-shot of a new site data component of the actual site data routine;

FIG. 17 is a screen-shot of a core calculator implemented with the energy usage algorithm;

FIG. 20 is a screen-shot of the power monitoring routine;

FIG. 22 is a screen-shot of the design set-up routine;

FIGS. 29A and 29B are respective schematics of suction superheat and discharge superheat monitoring algorithms;

FIG. 32 is a graph of alarming conditions and actions in response to each;

DETAILED DESCRIPTION OF THE PREFERRED EMBODIMENTS

The following description of the preferred embodiments is merely exemplary in nature and is in no way intended to limit the invention, its application, or uses.

Figure 1A:
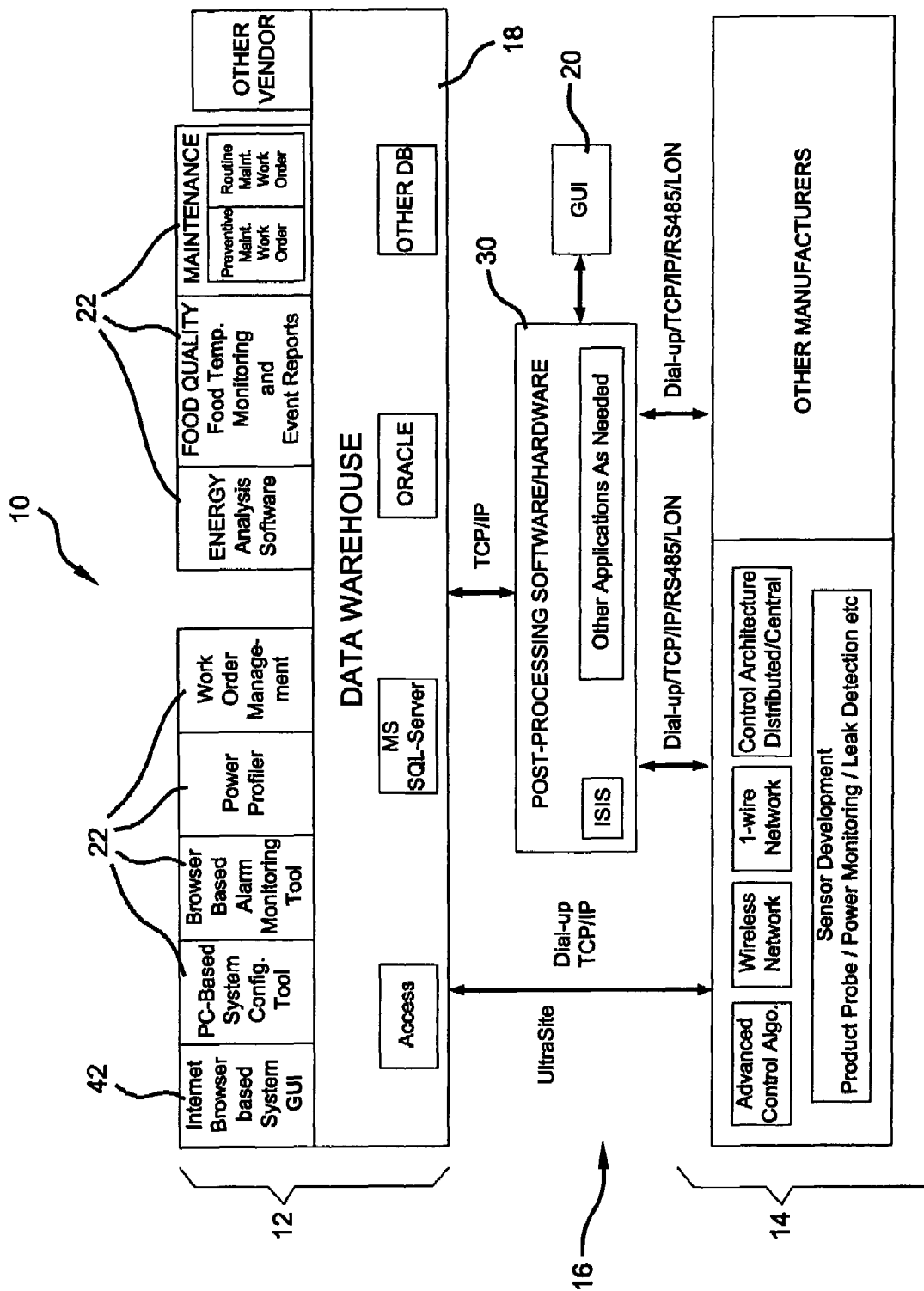
FIG. 1 is a schematic overview of a system for remotely monitoring and evaluating a remote location, in accordance with the principles of the present invention.
Figure 1B:
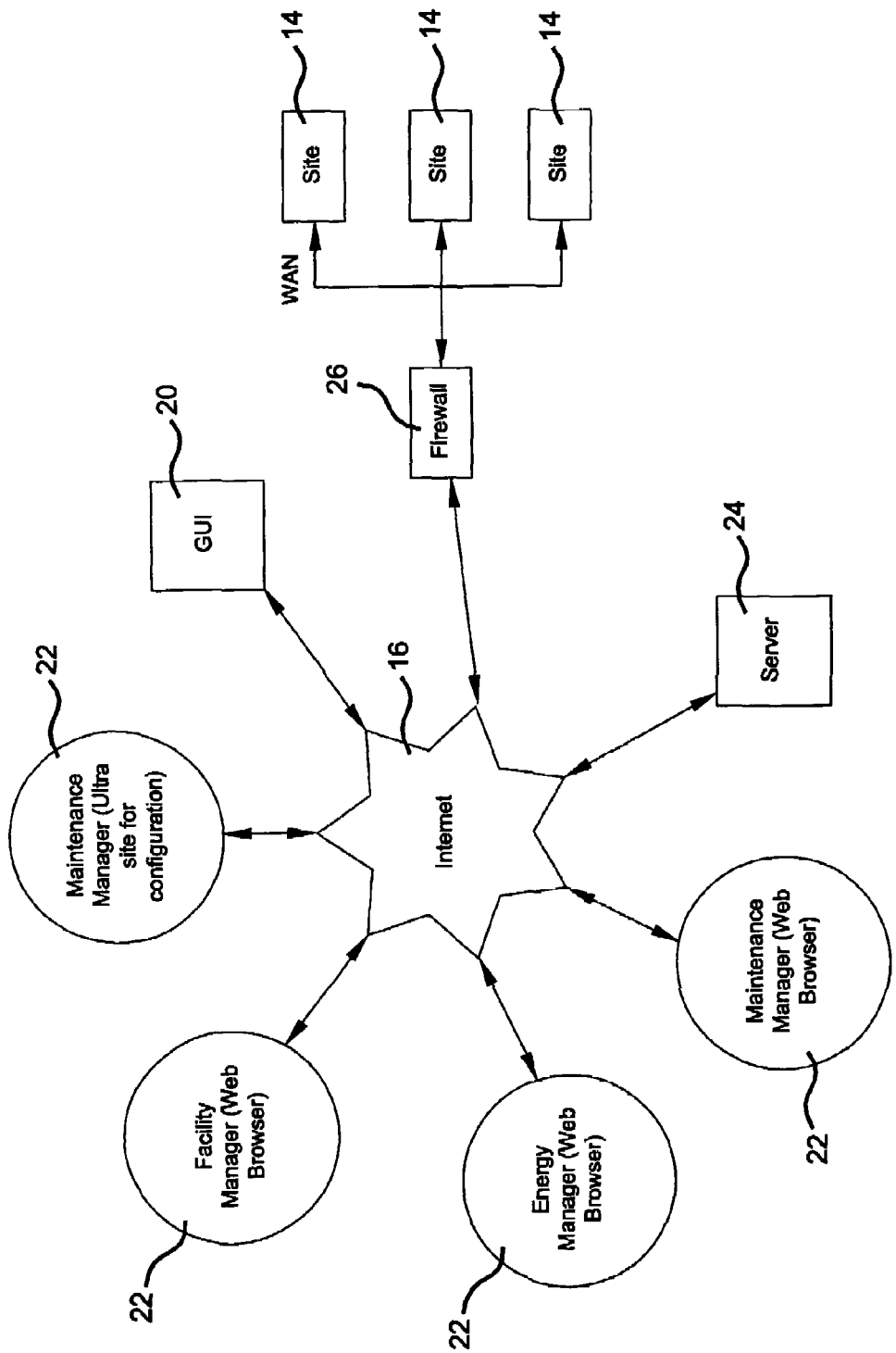

With reference to FIGS. 1A and 1B, the present invention provides a system 10 for remote monitoring, diagnosis and prognosis of food inventory and equipment of a retailer. The system 10 includes a management center 12 in communication with a remote location 14, such as a food retail outlet, having food inventory and equipment, such as a refrigeration system, HVAC system, lighting and the like, therein. A communication network 16 is provided for operably interconnecting the management center 12 and the remote location 14 enabling information transfer therebetween. The communication network 16 preferably includes a dial-up network, TCP/IP, Internet or the like. It will be appreciated by those skilled in the art, that the management center 12 may be in communication with a plurality of remote locations 14 through the communication network 16. In this manner, the management center 12 is able to monitor and analyze operation of multiple remote locations 14.

The management center 12 gathers operational data from the remote location 14 to analyze performance of several aspects of the remote location 14 through post-processing routines. Initially, the management center 12 may process temperature information for calculating food safety and food quality indices (FSI and FQI, respectively), as described in further detail below. Calculated values for FSI and FQI may be used by the management center 12 to alert a remote location 14 of food safety and quality performance. In this manner, the remote location 14 is able to adjust the operation of its systems to improve performance.

Also, the management center 12 may gather and process energy consumption information for its energy using equipment including various components of the refrigeration system and the refrigeration system as a whole. An analysis of the energy consumption of the energy using equipment enables the management center 12 to evaluate the overall efficiency thereof and identify any problem areas therewith. Finally, the management center 12 may gather information specific to each component of the refrigeration system for evaluating the maintenance measures each component may require. Both routine and preventative maintenance may be monitored and evaluated, thereby enabling the management center 12 to alert the remote location of potential equipment malfunctions. In this manner, overall efficiency of the refrigeration system may be enhanced.

Additionally, the management center 12 provides a data warehouse 18 for storing historical operational data for the remote location 14. The data warehouse 18 is preferably accessible through the communication network 16 utilizing commercially available database software such as Microsoft Access™, Microsoft SQL-Server™, ORACLE™, or any other database software.

The system 10 is remotely accessible through a graphical user interface 20 via a third-party computer system through the communication network. In an exemplary embodiment, a remote user may log into the system 10 through the Internet to view operational data for the remote location 14. The third-party computer system may include any web-enabled GUI known in the art, including but not limited to a computer, a cellular phone, a hand-held portable computer (e.g., Palm Pilot™) or the like.

The GUI 20 provides a view into the system 10 and allows the user to see the data for the remote location 14 via a standard web browser. The GUI 20 also provides access to software modules 22, which preferably run on one or more servers 24. The GUI 20 can provide this access using only a standard web browser and an Internet connection. Maintenance managers will use the GUI 20 to receive alarms for a specific remote location 14, acknowledge alarms, manually dispatch work orders based on the alarms, make changes to set points, ensure that a remote location 14 is performing as required (by monitoring case temperatures, rack pressures, etc.), and check a remote location 14 after the receipt of an alarm.

More specifically, the system 10 will make use of existing network infrastructure to add value to users who use the system for collecting and/or aggregating data. This value includes speeding up (and automating) the data collection process and enabling the aggregation of data to be performed automatically. The information that is retrieved from a remote location 14 resides on servers 24. Further, the system allows the ability to add software modules 22 to the server 24 that will extract additional information from the data. Examples are analyzing trend information of pressure and compressor status over a period of time and extracting performance degradation characteristics of the compressors.

FIG. 1B shows a diagram of the communications network 16. Multiple remote locations 14 exist behind a corporate firewall 26 and that the data behind the firewall 26 must be pushed to a server 24, which exists outside the firewall 26. Users are able to access the information via an Internet connection in the standard browser. In general, the user should be given the impression that he/she is always going through the server 24 to retrieve information from the remote location 14. It is possible for a user to view both real-time data generated at the site and aggregated data in a single view. Using this architecture, software modules 22 can be easily added to perform functions on the data.

Web-based navigation is accomplished by the GUI 20, which will be interfaced for all of the software modules 22. Alarm monitoring, energy analysis, food quality, and maintenance software modules 22 are described below, and each are accessible via the GUI 20. A software module 22 may even be provided for enabling the user to completely configure a controller, as discussed in further detail below. Its primary use will be during initial configuration of the controller. A work order module provides the capability to enter and track work orders for managing the maintenance schedule of the equipment of the remote location 14. An asset management module provides the capability to enter and track assets and view asset history.

The GUI 20 also offers a number of standard screens for viewing typical site data. A store summary screen is provided and lists the status of the refrigeration, building control systems and the like. A product temperature summary screen displays product temperatures throughout the store when using product temperature probes. An alarm screen enables the user to see the status of all alarms. The alarm screen provides information about particular alarms and enables the alarm to be acknowledged and reset, as discussed in further detail hereinbelow. Basic alarm viewing/notification capability is provided and includes the ability to view an alarm, acknowledge an alarm, and receive notification of the alarm. Notification is either via GUI/browser, e-mail, facsimile, page, or text message (SMS/e-mail) to a cellular telephone. Each alarm type has the capability of selecting whether notification is required and what (and to whom) the notification method will be.

The GUI 20 provides the capability to display historical (logged) data in a graphical format. In general, the graph should be accessible from the screen with a single click. Data is overlaid from different areas (e.g. case temperature with saturated suction temperature) on a single graph. Some historical data may be stored on a server 24. In general, the display of this data should be seamless and the user should not know the source of the data.

The GUI 20 provides the capability to display aggregated remote location data, which should be displayed as aggregated values and includes the capability to display power and alarm values. These views may be selected based on user requirements. For example, the GUI 20 provides the capability to display aggregated remote location power data for an energy manager log in and aggregated alarm data for a maintenance manager log in. The GUI 20 will provide a summary-type remote location screen with power and alarms for the remote location 14 as a default.

The GUI 20 provides the capability to change frequently used set points directly on the appropriate screen. Access to other set points is achieved via a set point screen that can be easily navigated with one click from the GUI 20. In general, applications on controllers have many set points, the majority of which are not used after the initial setup.

Returning to FIG. 1A, the remote location 14 may further include a post-processing system 30 in communication with the components of the refrigeration system through the controller. The post-processing system 30 is preferably in communication with the controller through a dial-up, TCP/IP, or local area network (LAN) connection. The post-processing system 30 provides intermediate processing of gathered data, which is analyzed to provide lower-level, local warnings. These lower-level, local warnings are in contrast to more detailed, higher-level warnings provided by the post-processing routines of the management center 12. The post-processing system 30 is preferably an "In-Store Information Server," or ISIS, that also provides a web gateway functionality. The ISIS platform of the preferred embodiment is a JACE/controller/web server commercially available from Tridium, Inc., of Richmond, Va., U.S.A.

Figure 2:
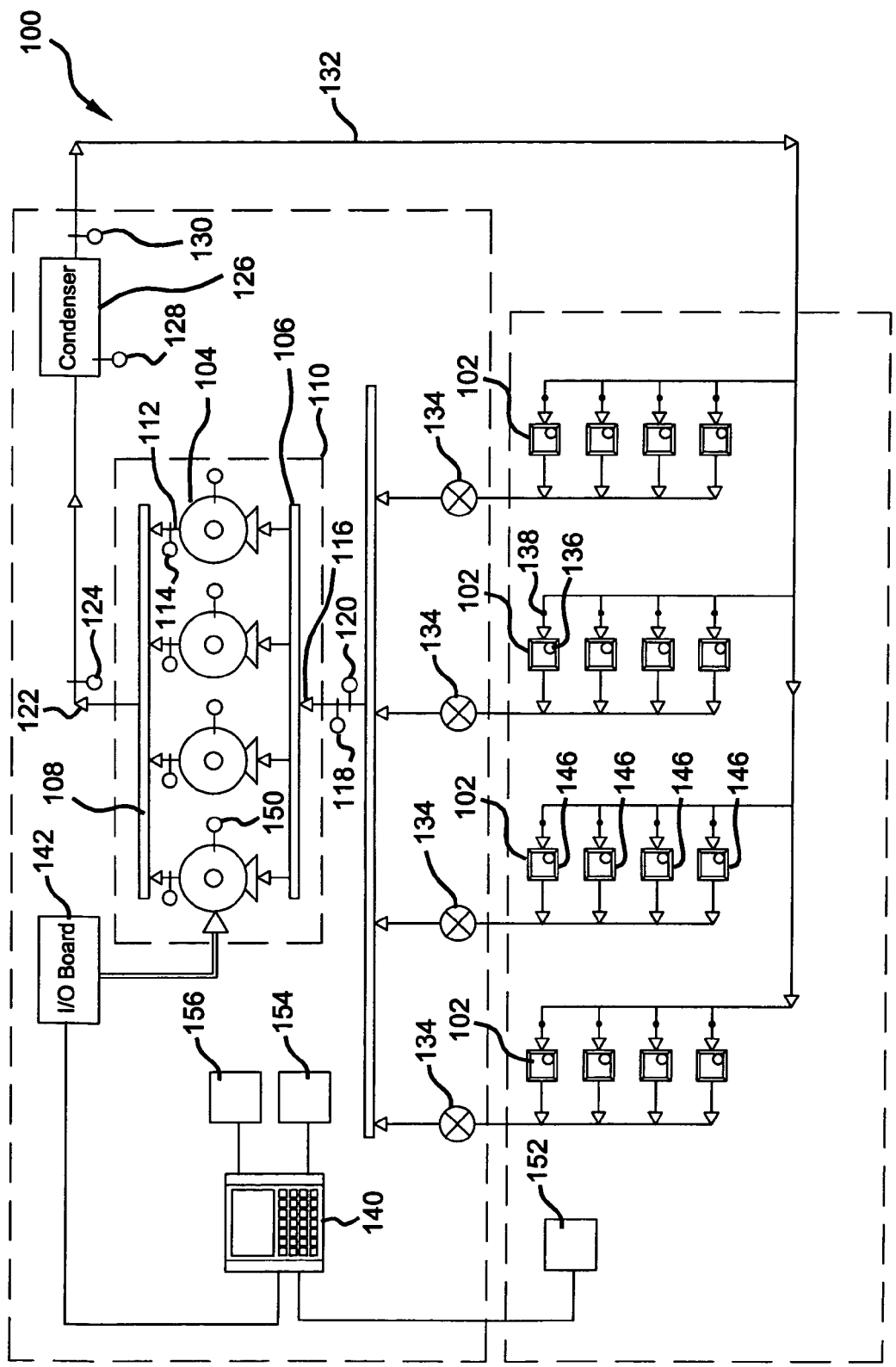
FIG. 2 is a schematic view of an exemplary refrigeration system according to the principles of the present invention.
Figure 3:
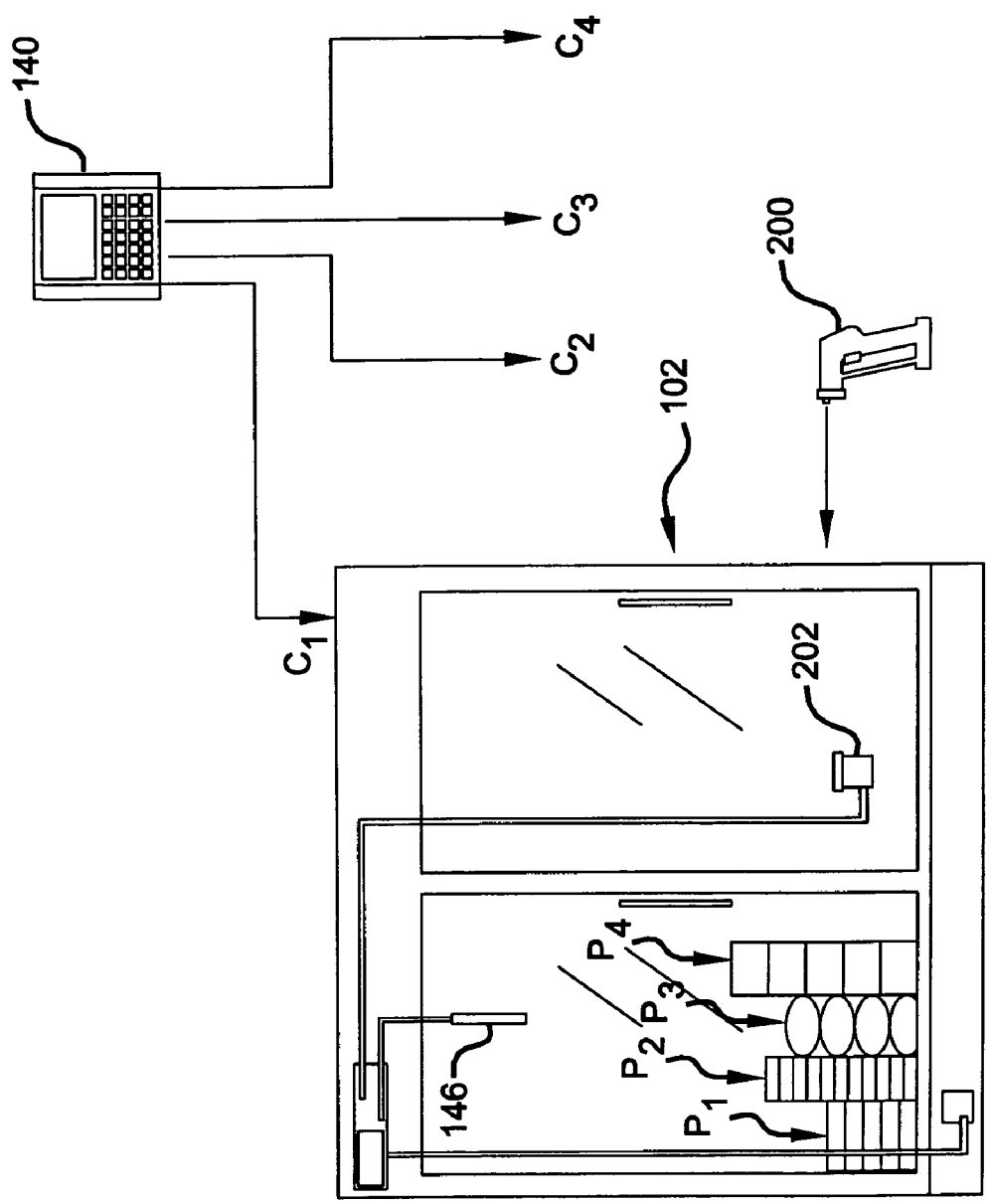
FIG. 3 is a frontal view of a refrigeration case of the refrigeration system of FIG. 2.

With reference to FIGS. 2 and 3, an exemplary refrigeration system 100 of the remote location 14 preferably includes a plurality of refrigerated food storage cases 102. The refrigeration system 100 includes a plurality of compressors 104 piped together with a common suction manifold 106 and a discharge header 108 all positioned within a compressor rack 110. A discharge output 112 of each compressor 102 includes a respective temperature sensor 114. An input 116 to the suction manifold 106 includes both a pressure sensor 118 and a temperature sensor 120. Further, a discharge outlet 122 of the discharge header 108 includes an associated pressure sensor 124. As described in further detail hereinbelow, the various sensors are implemented for evaluating maintenance requirements.

The compressor rack 110 compresses refrigerant vapor that is delivered to a condenser 126 where the refrigerant vapor is liquefied at high pressure. The condenser 126 includes an associated ambient temperature sensor 128 and an outlet pressure sensor 130. This high-pressure liquid refrigerant is delivered to a plurality of refrigeration cases 102 by way of piping 132. Each refrigeration case 102 is arranged in separate circuits consisting of a plurality of refrigeration cases 102 that operate within a certain temperature range. FIG. 2 illustrates four (4) circuits labeled circuit A, circuit B, circuit C and circuit D. Each circuit is shown consisting of four (4) refrigeration cases 102. However, those skilled in the art will recognize that any number of circuits, as well as any number of refrigeration cases 102 may be employed within a circuit. As indicated, each circuit will generally operate within a certain temperature range. For example, circuit A may be for frozen food, circuit B may be for dairy, circuit C may be for meat, etc.

Because the temperature requirement is different for each circuit, each circuit includes a pressure regulator 134 that acts to control the evaporator pressure and, hence, the temperature of the refrigerated space in the refrigeration cases 102. The pressure regulators 134 can be electronically or mechanically controlled. Each refrigeration case 102 also includes its own evaporator 136 and its own expansion valve 138 that may be either a mechanical or an electronic valve for controlling the superheat of the refrigerant. In this regard, refrigerant is delivered by piping to the evaporator 136 in each refrigeration case 102. The refrigerant passes through the expansion valve 138 where a pressure drop causes the high pressure liquid refrigerant to achieve a lower pressure combination of liquid and vapor. As hot air from the refrigeration case 102 moves across the evaporator 136, the low pressure liquid turns into gas. This low pressure gas is delivered to the pressure regulator 134 associated with that particular circuit. At the pressure regulator 134, the pressure is dropped as the gas returns to the compressor rack 110. At the compressor rack 110, the low pressure gas is again compressed to a high pressure gas, which is delivered to the condenser 126, which creates a high pressure liquid to supply to the expansion valve 138 and start the refrigeration cycle again.

A main refrigeration controller 140 is used and configured or programmed to control the operation of the refrigeration system 100. The refrigeration controller 140 is preferably an Einstein Area Controller offered by CPC, Inc. of Atlanta, Ga., U.S.A., or any other type of programmable controller that may be programmed, as discussed herein. The refrigeration controller 140 controls the bank of compressors 104 in the compressor rack 110, via an input/output module 142. The input/output module 142 has relay switches to turn the compressors 104 on an off to provide the desired suction pressure. A separate case controller (not shown), such as a CC-100 case controller, also offered by CPC, Inc. of Atlanta, Ga., U.S.A., may be used to control the superheat of the refrigerant to each refrigeration case 102, via an electronic expansion valve in each refrigeration case 102 by way of a communication network or bus. Alternatively, a mechanical expansion valve may be used in place of the separate case controller. Should separate case controllers be utilized, the main refrigeration controller 140 may be used to configure each separate case controller, also via the communication bus. The communication bus may either be a RS-485 communication bus or a LonWorks Echelon bus that enables the main refrigeration controller 140 and the separate case controllers to receive information from each refrigeration case 102.

Each refrigeration case 102 may have a temperature sensor 146 associated therewith, as shown for circuit B. The temperature sensor 146 can be electronically or wirelessly connected to the controller 140 or the expansion valve for the refrigeration case 102. Each refrigeration case 102 in the circuit B may have a separate temperature sensor 146 to take average/min/max temperatures or a single temperature sensor 146 in one refrigeration case 102 within circuit B may be used to control each refrigeration case 102 in circuit B because all of the refrigeration cases 102 in a given circuit operate at substantially the same temperature range. These temperature inputs are preferably provided to the analog input board 142, which returns the information to the main refrigeration controller 140 via the communication bus.

Additionally, further sensors are provided and correspond with each component of the refrigeration system and are in communication with the refrigeration controller. Energy sensors 150 are associated with the compressors 104 and condenser 126 of the refrigeration system 100. The energy sensors 150 monitor energy consumption of their respective components and relay that information to the controller 140.

Circuits and refrigeration cases 102 of the refrigeration system 100 include a screen 152 illustrating the type and status of the refrigeration case 102 or circuit. Temperatures are displayed via graphical means (e.g. a thermometer) with an indication of set point and alarm values. The screen 152 supports a display of case temperatures (i.e. return, discharge, defrost termination, coil in, coil out, and product temperatures) and the status of any digital inputs (i.e. cleaning, termination, etc.). The screen 152 also displays a defrost schedule and the type of termination (i.e. time, digital, temperature) for the last defrost. In general, all information related to a refrigeration case 102 or circuit will be displayed on or accessible through the screen 152.

A screen 154 is also provided to graphically display the status of each configured suction group. Discharge and suction pressures are displayed as gauges intended to be similar to the gauge set a refrigeration mechanic would use. The corresponding saturated suction temperature will be displayed as well. In general, suction groups are displayed graphically with icons that represent each compressor 104. The status of the compressors 104 is shown graphically, as well as the status of any configured unloaders. In general, all status information for a suction group is displayed on the screen 154.

A screen 156 is also provided to graphically display the status of each configured condenser 126. The suction and discharge pressure of the condenser 126 are displayed as gauges intended to be similar to a gauge set a refrigeration mechanic would use. The corresponding condensing temperature will be displayed as well. In general, the condenser 126 should be displayed graphically with icons that represent each fan of the condenser 126. A status of the fans is shown graphically. In general, all status information for a condenser 126 will be displayed on the screen 156.

A screen (not shown) will also be provided for roof top units (not shown), the detailed description of which is foregone. The status of the roof top unit will be shown with animated graphics (fan, airflow, cooling, heating, as animated pieces). The screen will also show the space temperature, supply temperature, etc. The set point and alarm values are shown for the space temperature. Humidity and humidity control may also be shown if configured.

It will be appreciated that the hereindescribed refrigeration system is merely exemplary in nature. The refrigeration system of the remote location may vary as particular design requirements of the location dictate.

Remote locations 14 having refrigeration systems 100 typically include food-product retailers and the like. The food-product retailers are concerned with both the safety and the aesthetic quality of the food products they sell. Generally, bacteria that pose a threat to human health are referred to as "pathogen" bacteria and grow quickly when the temperature of their host product rises above a certain threshold temperature. For example, forty-one (41) degrees Fahrenheit is recognized industry-wide as the temperature below which most pathogens grow slowly and below which perishable food products should be stored. Bacteria that diminish the quality (color, smell, etc.) of a food product are referred to as "spoiler" bacteria and have growth rates that vary from product to product. Spoiler bacteria generally grow more quickly than pathogen bacteria. Thus, a food product's quality may appear to be of poor color or smell but still safe for human consumption. Bacteria populations and disease risk are a function of both the frequency and severity of over-temperature product conditions. Biological growth rates increase non-linearly, as a product warms past about forty-one (41) degrees Fahrenheit. For example, a product at about fifty-one (51) degrees Fahrenheit is more likely to host large colonies of toxic bacteria than a product at about forty-four (44) degrees Fahrenheit. However, there may be as much risk from having the product in a case at about forty-four (44) degrees Fahrenheit for a longer period of time than in a single case at about fifty-one (51) degrees Fahrenheit for a shorter period of time.

The temperature of a host food product, as mentioned above, significantly influences the rate at which bacteria, whether spoiler or pathogen, grows. Generally, conventional refrigeration systems function using a cyclical temperature strategy. According to the cyclical temperature strategy, low and high temperature set points are predetermined. The refrigeration system operates to cool the products until the low temperature set point is achieved. Once achieving the low-temperature set point, the refrigeration system ceases cooling the food product and the temperature is allowed to rise until meeting the high-temperature set point. Once the high-temperature set point is achieved, cooling resumes until meeting the low-temperature set point.

Figure 4:
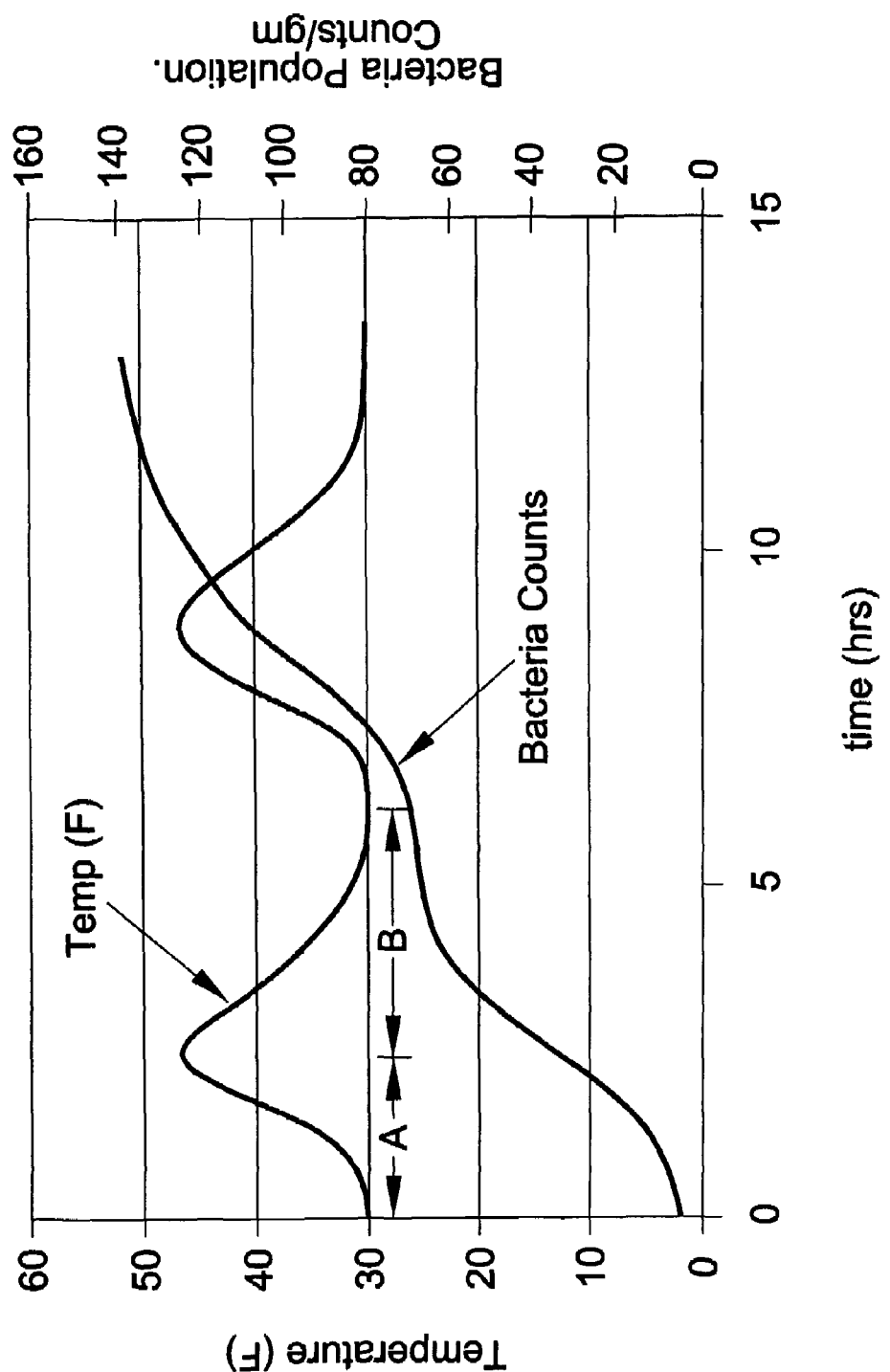
FIG. 4 is a graph displaying cyclical temperature effects on bacteria growth within the refrigeration system.

With particular reference to FIG. 4, cyclical temperature control and its effects on bacterial growth will be discussed in detail. An increase in temperature increases the rate at which bacteria grows. Time period A of the chart of FIG. 4 shows an exemplary increase in temperature from approximately thirty (30) degrees Fahrenheit to approximately fifty (50) degrees Fahrenheit. An increase in bacteria count is associated with the rise in temperature. The bacteria count of time period A rises from approximately ten thousand (10,000) counts/gm to approximately forty thousand (40,000) counts/gm. Time period B shows an exemplary decrease in temperature from the fifty (50) degrees Fahrenheit achieved at the end of time period A, to approximately thirty (30) degrees Fahrenheit. A decrease in the rate at which the bacteria grows is associated with the decrease in temperature. It is important to note, however, that the bacteria count still increases and only slows significantly when the temperature cools to about thirty (30) degrees Fahrenheit. The exemplary increase in bacteria count rises from approximately forty thousand (40,000) counts/gm to approximately seventy thousand (70,000) counts/gm. The first half of time period B reflects a significant rate of growth of bacteria while a decrease in the rate is not achieved until the latter half of time period B. Thus, re-chilling or re-freezing of food products does not kill or reduce the bacteria-count, but simply reduces the growth rate of the bacteria.

The system of the present invention implements a variety of monitoring and alarming routines provided in the form of software. Components of these routines include product temperature monitoring and alarming. To achieve this, the routines include a time/temperature alarming routine, a degree/minutes alarming routine and a bacteria-count alarming routine. While each of these routines is described in detail hereinbelow, it should be noted that in terms of food safety and quality they are listed in order of increasing effectiveness. In other words, the time/temperature alarming routine provides a good means of monitoring product temperature while the bacteria-count alarming routine provides the most effective means.

Figure 5:
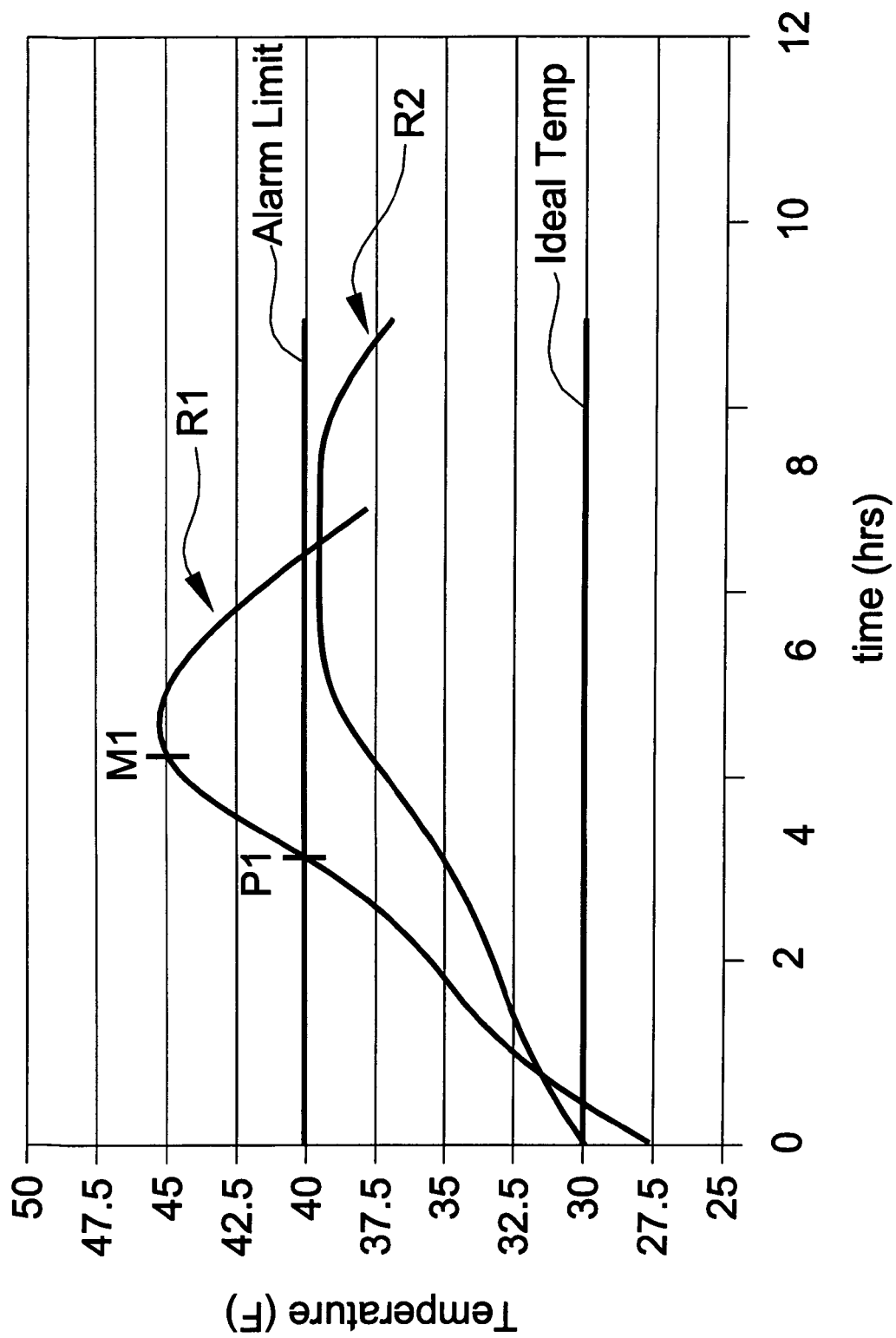
FIG. 5 is a graphical representation of a time-temperature method for monitoring bacteria growth within the refrigeration system.

With reference to FIG. 5, the time/temperature alarming routine will be described in detail. Initially, both time and temperature set points are provided. In the exemplary embodiment of FIG. 5, the time set point is sixty (60) minutes and the temperature set point is about forty (40) degrees Fahrenheit. The time and temperature set points are combined to provide an alarming point. In the exemplary case, the alarming point would be the point at which the product has been at a temperature greater than forty (40) degrees Fahrenheit for longer than sixty (60) minutes. With reference to alarm scenario R1 of FIG. 5, the product temperature passes forty (40) degrees Fahrenheit at point P1. Thus, the sixty (60) minute clock begins running at point P1. If the product temperature has not fallen back below about forty (40) degrees Fahrenheit within the sixty (60) minute timeframe then an alarm is signaled. Point M1 represents the point at which sixty (60) minutes have passed and the temperature has remained over about forty (40) degrees Fahrenheit. Therefore, in accordance with the time/temperature routine, an alarm would be signaled at point M1.

Although the above-described time/temperature routine is a good method of monitoring product temperature, it retains specific disadvantages. One disadvantage is that bacteria count is not considered. This is best illustrated with reference to alarm scenario R2. As can be seen, the product temperature of alarm scenario R2 increases, approaching the about forty (40) degrees Fahrenheit temperature set point without ever crossing it. As discussed above, with respect to FIG. 4, increases in temperature, even though below the about forty (40) degrees Fahrenheit temperature set point, results in increased rate of bacteria growth. Thus, although the time/temperature routine would not signal an alarm in alarm scenario R2, bacteria growth would continue, approaching undesired levels of bacteria count over time.

Figure 6:
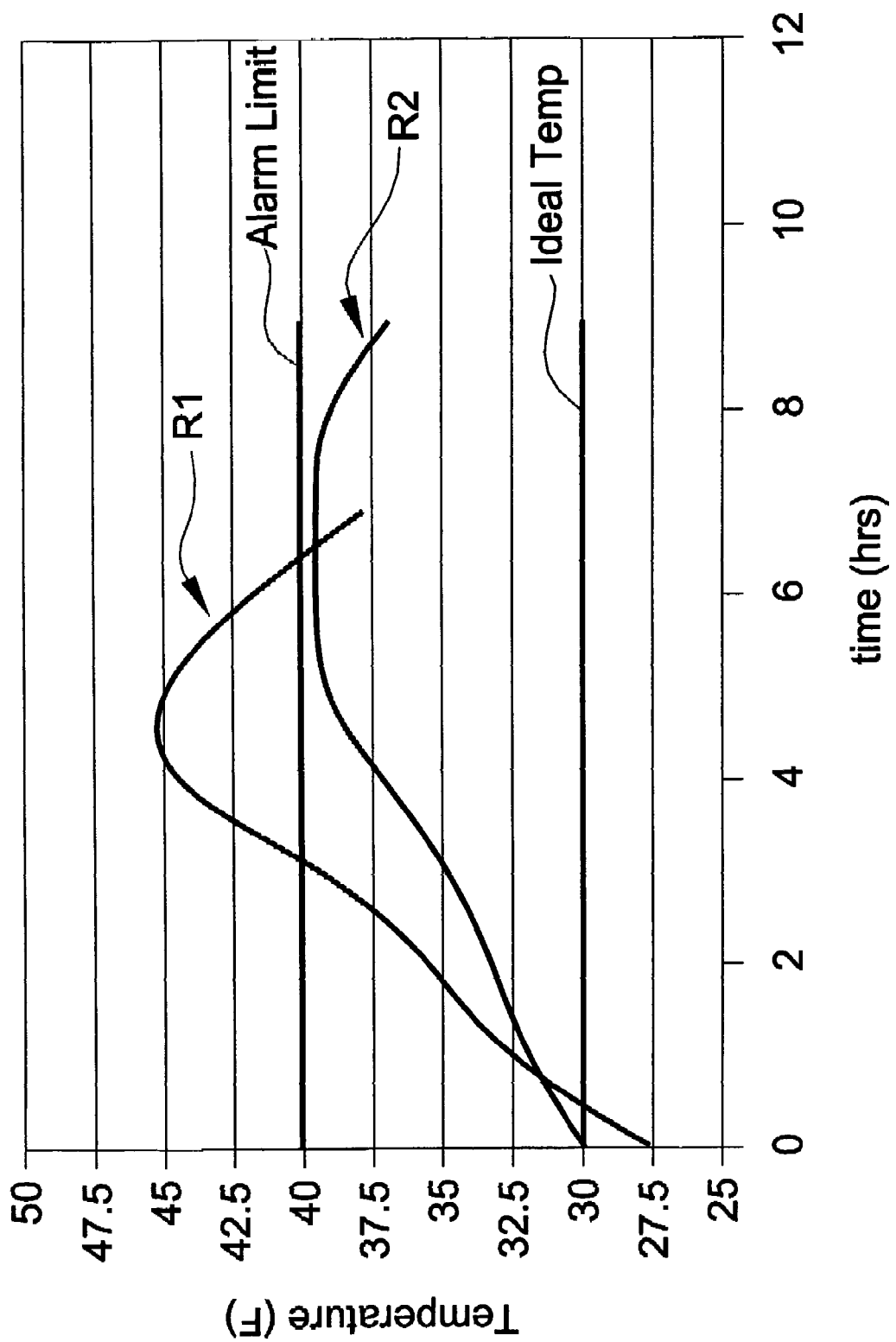
FIG. 6 is a graphical representation of a degree-minute method for monitoring bacteria growth within the refrigeration system.

With reference to FIG. 6, the degree/minutes alarming routine will be described in detail. Initially, a degree/minutes set point is determined. In the exemplary case, the degree/minutes set point is about eight hundred (800). This value is provided as an average value determined from historical data and scientific testing and analysis of bacteria growth. In this manner, bacteria growth is considered when determining whether an alarm is signaled. With reference to alarm scenarios R1 and R2 of FIG. 6, the degree/minute alarming routine integrates the ideal product temperature curve (i.e., area above "ideal temp" line) with respect to time. If the integration results in a value of about eight hundred (800) or greater, an alarm is signaled. In the exemplary case both alarm scenarios R1, R2 would result in an alarm. Alarm scenario R1 would most likely signal an alarm prior to alarm scenario R2. This is because the bacteria growth rate would be significantly higher for alarm scenario R1. An alarm would be signaled in alarm scenario R2 because, although the product temperature of alarm scenario R2 never rises above an accepted temperature (i.e., about forty (40) degrees Fahrenheit), the borderline temperature of alarm scenario R2 results in a high enough bacteria growth rate that undesired bacteria levels would be achieved in time.

Figure 7:
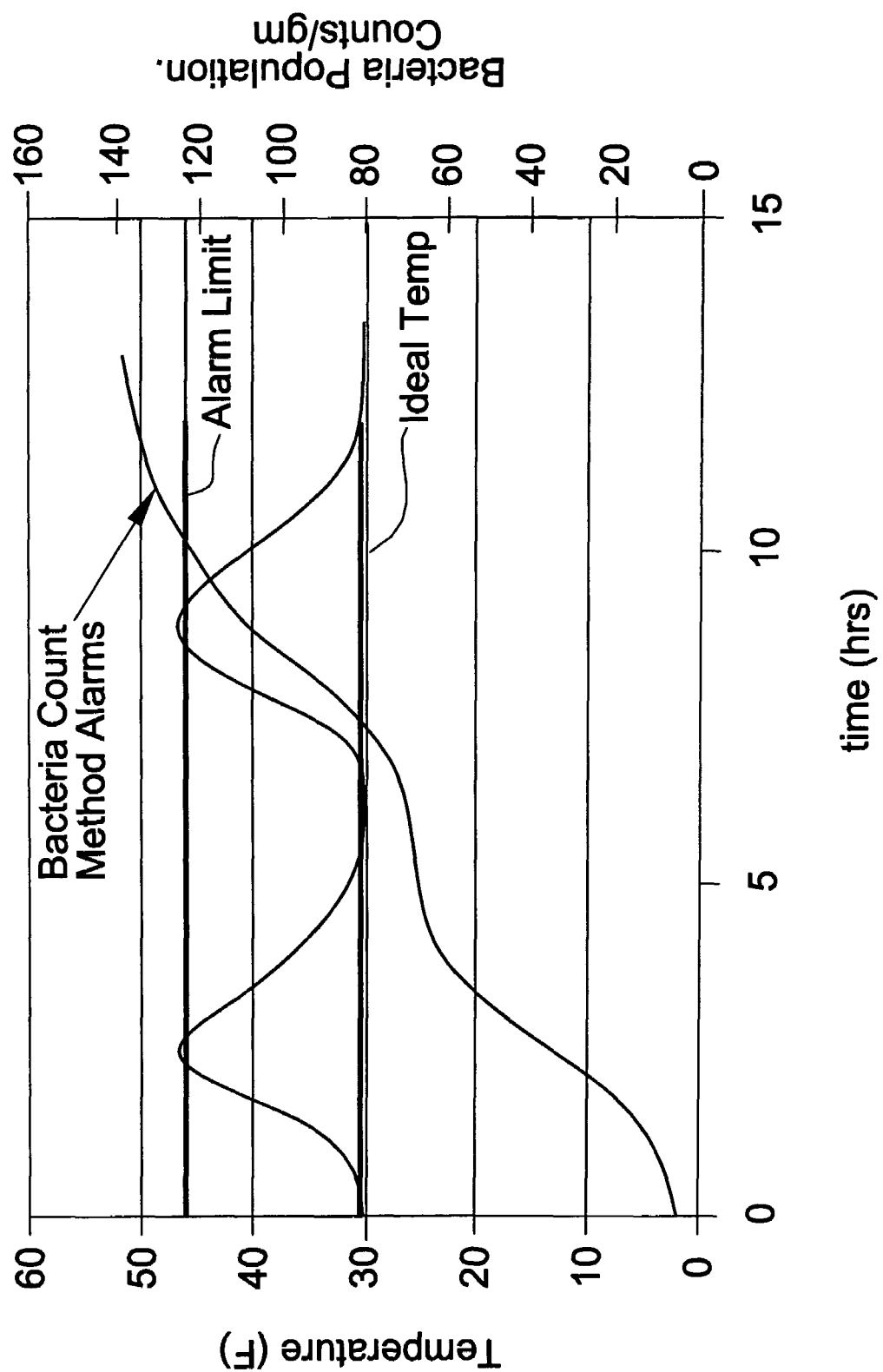
FIG. 7 is a graphical representation of a bacteria count method for monitoring bacteria growth within the refrigeration system.

With reference to FIG. 7, the bacteria-count alarming routine will be described in detail. Initially, an alarm set point is determined according to the maximum acceptable bacteria count for the product. In the exemplary case, the alarm set point is approximately one hundred twenty thousand (120,000) counts/gm. FIG. 7, similarly to FIG. 4, shows a cyclical-temperature curve and a bacteria-count curve. The bacteria-count routine periodically calculates the bacteria count for a given temperature at a given time, thereby producing the bacteria-count curve. Given the cyclical temperature of the exemplary case of FIG. 7, neither of the aforementioned alarming routines would signal an alarm. However, once the bacteria count is greater than the approximately one hundred twenty thousand (120,000) counts/gm alarm set point, an alarm is signaled. As noted previously, the bacteria count alarming routine is the most effective of those described herein. The effectiveness of the bacteria count alarming routine is a result of the direct relation to an actual bacteria count of the product.

Bacteria count is calculated for each type of bacteria (i.e., pathogen, spoiler), and is a function of a base bacteria count, time, product type, and temperature. Initially, base bacteria counts ($N_o$) are provided for each type of bacteria. As provided by the present invention, an exemplary base bacteria count for pathogen bacteria is about one hundred (100) counts/gram and for spoiler bacteria is about ten thousand (10,000) counts/gram. These values have been determined through experiment and analysis of the bacteria types. Both the product type and temperature determines the rate at which a particular type of bacteria will grow. The present invention further provides initial temperatures for both pathogen and spoiler bacteria, at which, their respective growth is effectively stopped. In an exemplary embodiment, the initial temperature for pathogens is twenty-nine (29) degrees Fahrenheit and for spoilers is eighteen and one-half (18.5) degrees Fahrenheit. Similarly to the initial bacteria count values, these values have been determined through experiment and analysis of the bacteria types. In general, experimental bacteria counts for both pathogens and spoilers were plotted with respect to temperature. A line was interpolated for each and extrapolated to find their respective y-intercepts, or temperature values for zero growth.

Algorithms are provided in the form of software modules that can reside either in software module twenty-two (22) or post-processing system thirty (30) (ISIS). Both spoiler and pathogen bacteria are calculated based on time and temperature measured by an infrared temperature gun two hundred (200) or a food product simulator two hundred two (202). A food quality alarm is generated when the spoiler bacteria multiplies ten (10) times and food safety alarm is generated when pathogen bacteria multiplies five (5) times. Additionally, index calculation, namely FQI and FSI, is done to rate the performance of a fixture, department or store within a chain. As a result the FSI determination uses worst-case values to provide a conservative valuation of food safety risk and to minimize the possibility of an undetected food safety problem. The FQI enables monitoring of the aesthetic quality of products, thereby enabling the remote location to increase the shelf life of perishable products resulting in increased customer satisfaction and cost savings.

Figure 8:
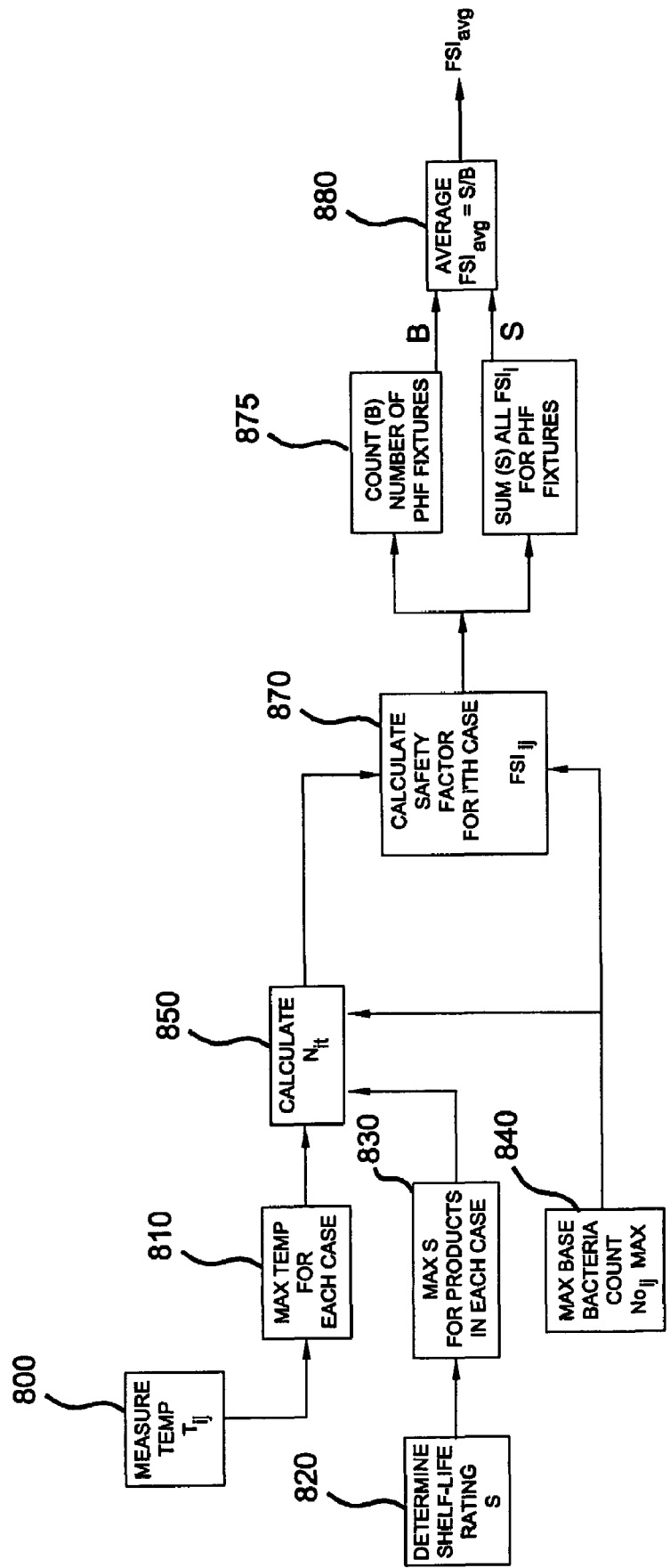
FIG. 8 is a flowchart outlining a method of calculating a food safety index according to the principles of the present invention.

With reference to FIG. 8, the algorithm for calculating the FSI will be described in detail. The FSI of the present invention corresponds to bacterial risk levels and provides a method for relative-risk evaluation. Initially, at step 800, the temperature of a product sample from each of the product groups ($P_1, P_2, \ldots, P_j$) will be measured in each of the cases ($C_1, C_2, \ldots, C_i$) (see FIG. 3). Thus, a temperature matrix is formed accounting for a sample of each of the products in each of the cases:

| $C_1$: | $T_{11}$ | $T_{12}$ | $\ldots$ | $T_{1j}$ |
|---|---|---|---|---|
| $C_2$: | $T_{21}$ | $T_{22}$ | $\ldots$ | $T_{2j}$ |
| $C_i$: | $T_{i1}$ | $T_{i2}$ | $\ldots$ | $T_{ij}$ |

After the product temperatures are measured, the maximum product temperature is determined for each case ($C_1, C_2, \ldots, C_i$), at step 810, as follows:

$$\text{MAX }(T_{11}, T_{12}, \ldots, T_{1j}) = T_{1MAX}$$

$$\text{MAX }(T_{21}, T_{22}, \ldots, T_{2j}) = T_{2MAX}$$

$$\text{MAX }(T_{i1}, T_{i2}, \ldots, T_{ij}) = T_{iMAX}$$

Each food product ($P_1, P_2, \ldots, P_j$) has an associated expected shelf life rating ($S_1, S_2, \ldots, S_j$). The shelf life ratings ($S_1, S_2, \ldots, S_j$), designated at step 820, are based on scientifically developed and experimentally confirmed micro-organism growth equations. At step 830, the maximum shelf life rating ($S_{1MAX}, S_{2MAX}, \ldots, S_{jMAX}$) for the products ($P_1, P_2, \ldots, P_j$) within each case ($C_1, C_2, \ldots, C_i$) is determined as follows:

$$\text{MAX }(S_{11}, S_{12}, \ldots, S_{1j}) = S_{1MAX}$$

$$\text{MAX }(S_{21}, S_{22}, \ldots, S_{2j}) = S_{2MAX}$$

$$\text{MAX }(S_{i1}, S_{i2}, \ldots, S_{ij}) = S_{iMAX}$$

Each food product ($P_1, P_2, \ldots, P_j$) further has an associated base bacteria count ($N_{o1}, N_{o2}, \ldots, N_{oj}$). At step 840, the maximum base bacteria count ($N_{o1}, N_{o2}, \ldots, N_{oj}$) for the products ($P_1, P_2, \ldots, P_j$) within each case ($C_1, C_2, \ldots, C_i$) is determined as follows:

$$\text{MAX }(N_{o11}, N_{o12}, \ldots, N_{o1j}) = N_{o1MAX}$$

$$\text{MAX }(N_{o21}, N_{o22}, \ldots, N_{o2j}) = N_{o2MAX}$$

$$\text{MAX }(N_{oi1}, N_{oi2}, \ldots, N_{oij}) = N_{oiMAX}$$

Having determined the maximum temperature, the maximum shelf-life rating and the maximum base bacteria count for the products ($P_1, P_2, \ldots, P_j$) in each case ($C_1, C_2, \ldots, C_i$), a bacteria count ($N_{1t}, N_{2t}, \ldots, N_{it}$) is calculated for a specific time (t) for each case ($C_1, C_2, \ldots, C_i$) at step 850. The bacteria count ($N_{1t}, N_{2t}, \ldots, N_{it}$) is a function of the maximum product temperature, the maximum base bacteria count, and the maximum shelf-life rating, as determined above, with respect to the type of bacteria concerned. The bacteria count is provided as:

$$N_{it} = N_{oimax} \times 2^{g_i}$$

where $g_i = \text{shelf life} \times [m \times T_p + c]^2$

In the case of food safety, the concerned bacteria are pathogens. Thus, the values m and c are the slope and intercept for the model generated for pathogen bacteria, discussed above.

Having determined the bacteria counts ($N_{1t}, N_{2t}, \ldots, N_{it}$) and the threshold maximum base bacteria counts ($N_{o1MAX}, N_{o2MAX}, \ldots, N_{ojMAX}$), the food safety index (FSI) for each case ($C_1, C_2, \ldots, C_i$) is calculated at step 870. The calculation of the FSI for each case is determined by the following equation:

$$FSI_i = 100 \times [1 - [\ln(N_{it}/N_{oiMAX})/\ln 2] \times 0.2]$$

As a result, FSI values for each case are calculated.

Bacteria populations and disease risk are a function of both the frequency and severity of over-temperature product conditions. Biological growth rates increase non-linearly, as a product warms past forty-one (41) degrees Fahrenheit. For example, a product at fifty-one (51) degrees Fahrenheit is more likely to host large colonies of toxic bacteria than a product at forty-four (44) degrees Fahrenheit. However, there may be as much risk from having the product in a case at forty-four (44) degrees Fahrenheit for a longer period of time than in a single case at fifty-one (51) degrees Fahrenheit for a shorter period of time. To account for this variation, an average safety factor $FSI_{AVG}$ is used.

Having determined a FSI for each case of the refrigeration system, secondary parameters B and R are subsequently calculated at step 875. The secondary parameter B is equal to the number of cases and R is equal to the sum of all of the FSIs for the cases that has potentially hazardous food (PHF). At step 880, secondary parameters B and R are used to calculate the average FSI, as follows:

$$FSI_{AVG} = R/B$$

Thus, the FSI for a department or store is provided as $FSI_{AVG}$.

Figure 9:
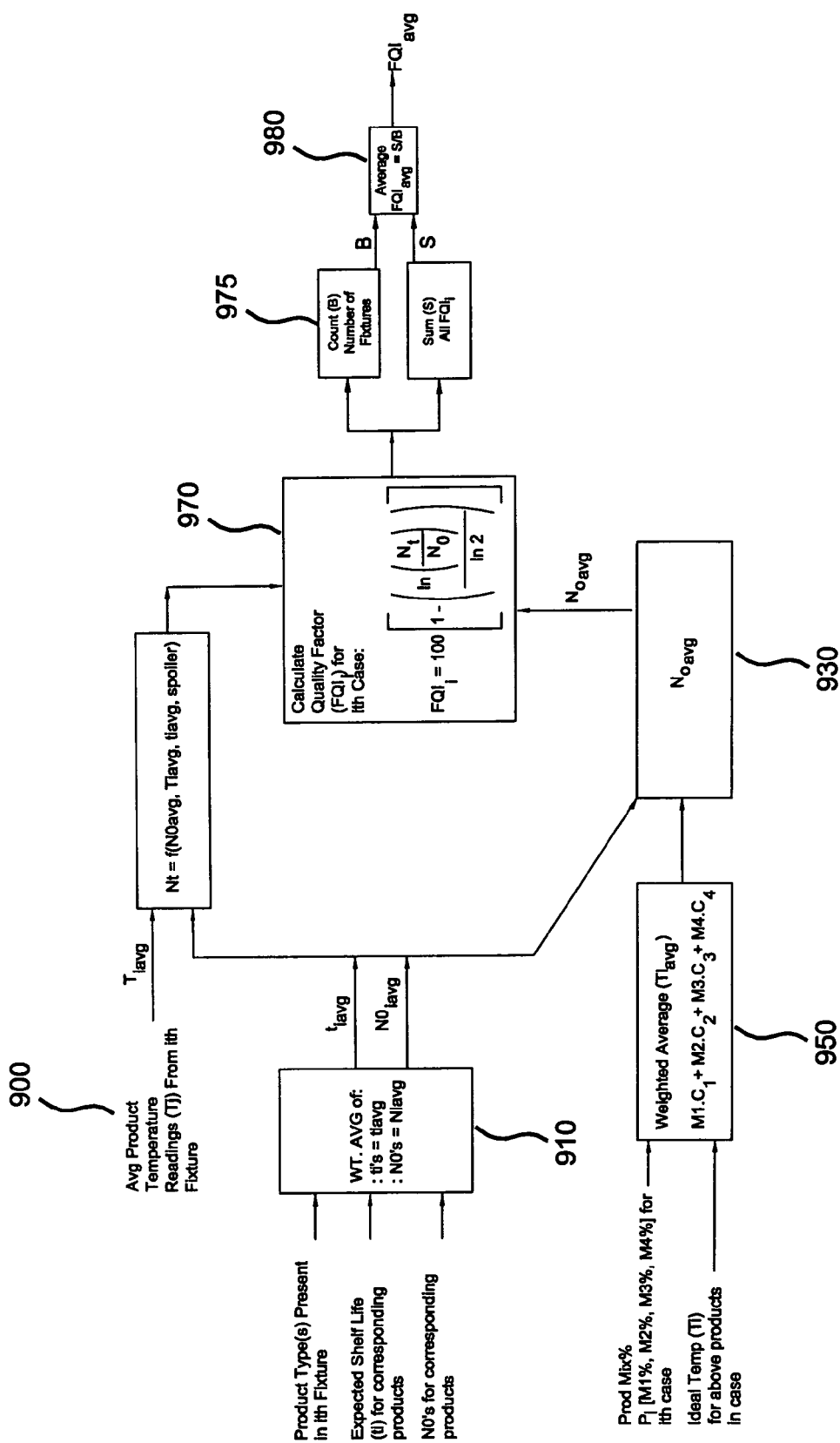
FIG. 9 is a flowchart outlining a method of calculating a food quality index according to the principles of the present invention.

With particular reference to FIG. 9, the algorithm for calculating the FQI will be described in detail. Initially, at step 900, the temperature of each of the product groups ($P_1$, $P_2$, ..., $P_j$) will be measured in each of the cases ($C_1$, $C_2$, ..., $C_i$) (see FIG. 2). Thus, a temperature matrix is formed accounting for all of the products in all of the cases:

| | | | | |
|---|---|---|---|---|
| $C_1$: | $T_{11}$ | $T_{12}$ | ... | $T_{1j}$ |
| $C_2$: | $T_{21}$ | $T_{22}$ | ... | $T_{2j}$ |
| $C_i$: | $T_{i1}$ | $T_{i2}$ | ... | $T_{ij}$ |

After the product temperatures are measured, the average temperature for each product group P within each case C is determined at step 910.

$$T_{1AVG} = AVG(T_{11}, T_{12}, \ldots, T_{1j})$$

$$T_{2AVG} = AVG(T_{21}, T_{22}, \ldots, T_{2j})$$

$$T_{iAVG} = AVG(T_{i1}, T_{i2}, \ldots, T_{ij})$$

As discussed above with respect to the FSI, each food product has an associated shelf-life rating ($S_1$, $S_2$, ..., $S_i$). At step 920 of the FQI calculation, the average shelf-life rating ($S_{1AVG}$, $S_{2AVG}$, ..., $S_{jAVG}$) for the products ($P_1$, $P_2$, ..., $P_j$) within each case ($C_1$, $C_2$, ..., $C_i$) is determined as follows:

$$AVG(S_{11}, S_{12}, \ldots, S_{1j}) = S_{1AVG}$$

$$AVG(S_{21}, S_{22}, \ldots, S_{2j}) = S_{2AVG}$$

$$AVG(S_{i1}, S_{i2}, \ldots, S_{ij}) = S_{iAVG}$$

As further discussed above, each food product ($P_1$, $P_2$, ..., $P_j$) has an associated base bacteria count ($N_{o1}$, $N_{o2}$, ..., $N_{oj}$). At step 930, the average base bacteria count ($N_{o1AVG}$, $N_{o2AVG}$, ..., $N_{ojAVG}$) for the products ($P_1$, $P_2$, ..., $P_j$) within each case ($C_1$, $C_2$, ..., $C_i$) is determined as follows:

$$AVG(N_{o11}, N_{o12}, \ldots, N_{o1j}) = N_{o1AVG}$$

$$AVG(N_{o21}, N_{o22}, \ldots, N_{o2j}) = N_{o2AVG}$$

$$AVG(N_{oi1}, N_{oi2}, \ldots, N_{oij}) = N_{oiAVG}$$

Furthermore, an ideal storage temperature TI is associated with each product P. The product mixes for each case C are determined at step 940 and are generally given as follows:

$$C_i[P_1\%, P_2\%, \ldots, P_j\%]$$

Using the product mix values, a weighted average is determined for the ideal temperature TI, at step 950, as follows:

Ideal Temperature TI:

$$TI_{1AVG} = TI_1 P_1\% + TI_2 P_2\% + \ldots + TI_j P_j\%$$

$$TI_{2AVG} = TI_1 P_1\% + TI_2 P_2\% + \ldots + TI_j P_j\%$$

$$TI_{iAVG} = TI_1 P_1\% + TI_2 P_2\% + \ldots + TI_j P_j\%$$

Having determined the average temperature, the average shelf-life rating and the average base bacteria count for the products ($P_1$, $P_2$, ..., $P_j$) in each case ($C_1$, $C_2$, ..., $C_i$), a bacteria count ($N_{1t}$, $N_{2t}$, ..., $N_{it}$) is calculated for a specific time (t) for each case ($C_1$, $C_2$, ..., $C_i$). The bacteria count ($N_{1t}$, $N_{2t}$, ..., $N_{it}$) is a function of the average product temperature, the average base bacteria count, and the average shelf-life rating, as determined above, with respect to the type of bacteria concerned. In the case of food quality, the concerned bacteria are spoiler. The bacteria count is calculated as previously discussed hereinabove.

Having determined the bacteria counts ($N_{1t}$, $N_{2t}$, ..., $N_{it}$) and the average base bacteria counts ($N_{o1AVG}$, $N_{o2AVG}$, ..., $N_{oiAVG}$), the food quality index (FQI) for each case ($C_1$, $C_2$, ..., $C_i$) is calculated at step 970. The calculation of the FQI for each case is determined by the following equation:

$$FQI_i = 100 \times [1 - [\ln(N_{it}/N_{oiAVG})/\ln 2] \times 0.1]$$

As a result, FQIs are calculated for each case C.

Having determined the FQI for each case C of the refrigeration system, secondary parameters B and R are subsequently calculated at step 975. As before, secondary parameter B is equal to the number of cases and R is equal to the sum of all of the quality factors. At step 980, secondary parameters B and R are used to calculate the average quality factor $FQI_{AVG}$, as follows:

$$FQI_{AVG} = R/B$$

Thus, the FQI for a department or store is provided as $FQI_{AVG}$.

The system further provides a method for estimating the shelf life of products within a specific case as a function of historical temperature data and any occurrences (e.g. power outages and the like) at a particular location. The shelf life estimation method is case based. A new counter is started for each day and has a maximum length of five (5) days. Generally, food product turnover is less than five (5) days, however, the maximum length of days may vary. For each day, bacteria count is determined, as described above, using the particular temperatures experienced by the case for that day. In this manner, the growth of bacteria for the given case can be monitored and evaluated to determine how much longer products put into the case on a particular day may safely remain in the case. For example, the shelf life of a product that has been put into a case one day ago is a function of the temperatures experienced over the first day. At the same time, however, the shelf life of a product that has been in the case for three days will be determined as a function of the temperatures experienced over those three days.

In a first preferred embodiment, the temperature measurements for either the FSI or FQI calculation are achieved using a hand-held infrared temperature sensor measurement device such as an infrared temperature gun 200 (see FIG. 3) commonly known in the art during an "audit" process. It is anticipated that the gun 200 will measure the temperatures of a sample of each product group and determine the average, minimum and maximum temperature values. In this manner, only one audit process is required to calculate both FSI and FQI. The audit process preferably occurs regularly (i.e., yearly, monthly, weekly, daily, etc.).

It is also anticipated that continuous food product temperature measurement is achieved real-time, as opposed to an audit process. For example, a food product simulator 202 (see FIG. 3) may be disposed in each refrigerator case ($C_i$) for each food product group ($P_j$) within the refrigerator case ($C_i$). A detailed description of the food product simulator is provided in co-pending application Ser. No. 09/564,173, filed on May 3, 2000, with the United States Patent and Trademark Office, entitled "Wireless Method And Apparatus For Monitoring And Controlling Food Temperature," hereby incorporated by reference. The product group temperature samples are read by the controller 140 and are continuously monitored during a "monitor" process. It is anticipated that at least one simulator 202 will be present for each product group ($P_j$) in a particular case ($C_i$). The monitor process may record temperature values at a predetermined rate (i.e., every minute, 10 minutes, etc.) that is operator programmable into the controller 140, or real-time. The implementation of a food product simulator 202 is exemplary in nature and it is anticipated that other products and methods can be used to achieve real-time or periodic sampling within the scope of the invention.

As discussed previously, the present invention provides a method for gathering and processing energy consumption information for various equipment within a food retailer. Of particular importance is the energy consumption of the refrigeration system 100. To monitor the energy consumption performance of the refrigeration system 100, a software module 22 is provided that runs the hereindescribed algorithms and routines required. In the present embodiment, the software is provided as a Microsoft™ Excel™ workbook implementing the Visual Basic programming language. It is anticipated, however, that the software may be provided in any one of a number of formats or programmed using any one of a number of programming languages commonly known in the art.

Figure 10:
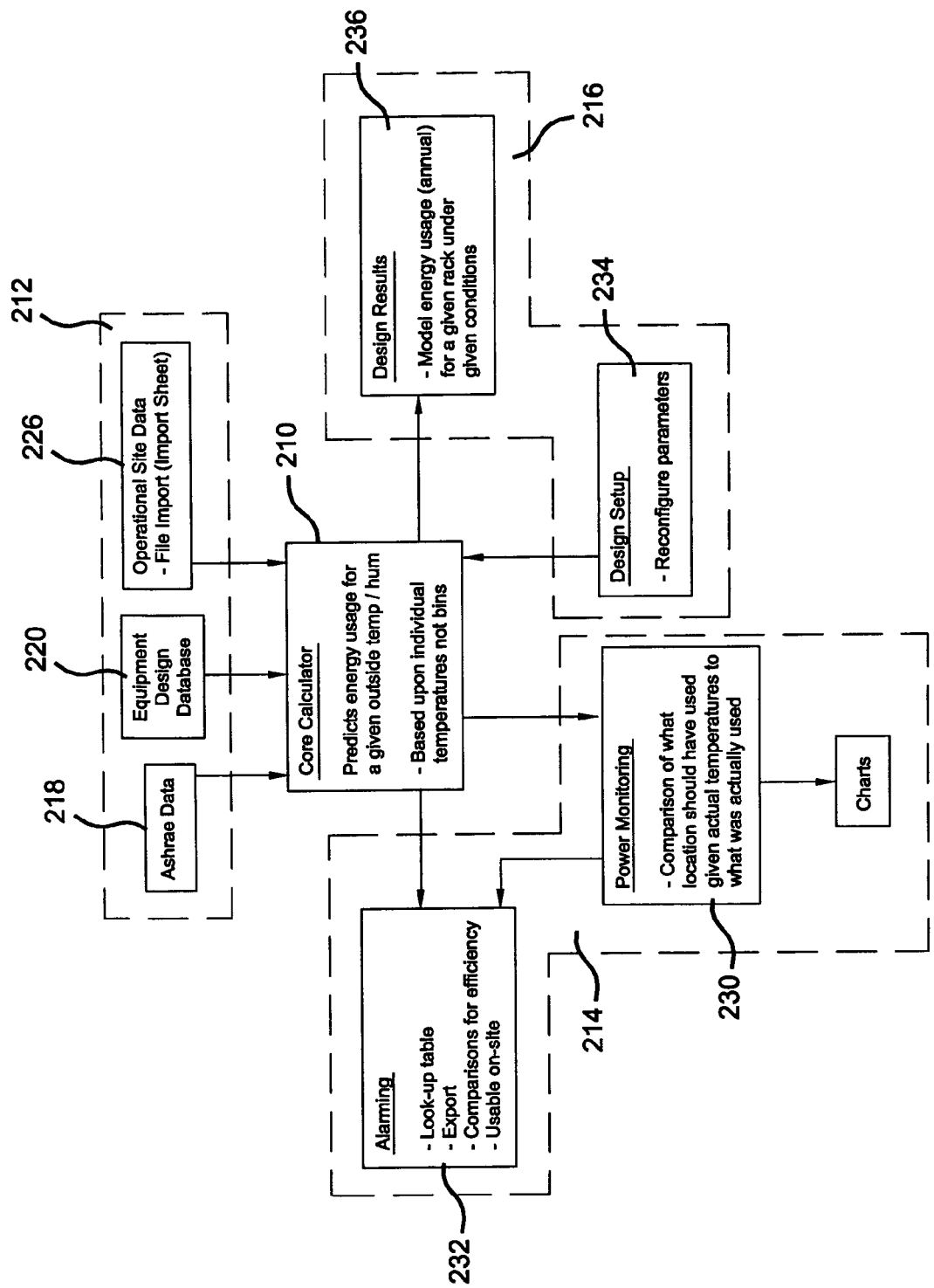
FIG. 10 is a schematic view of an energy usage algorithm in according to the principles of the present invention.
Figure 12:
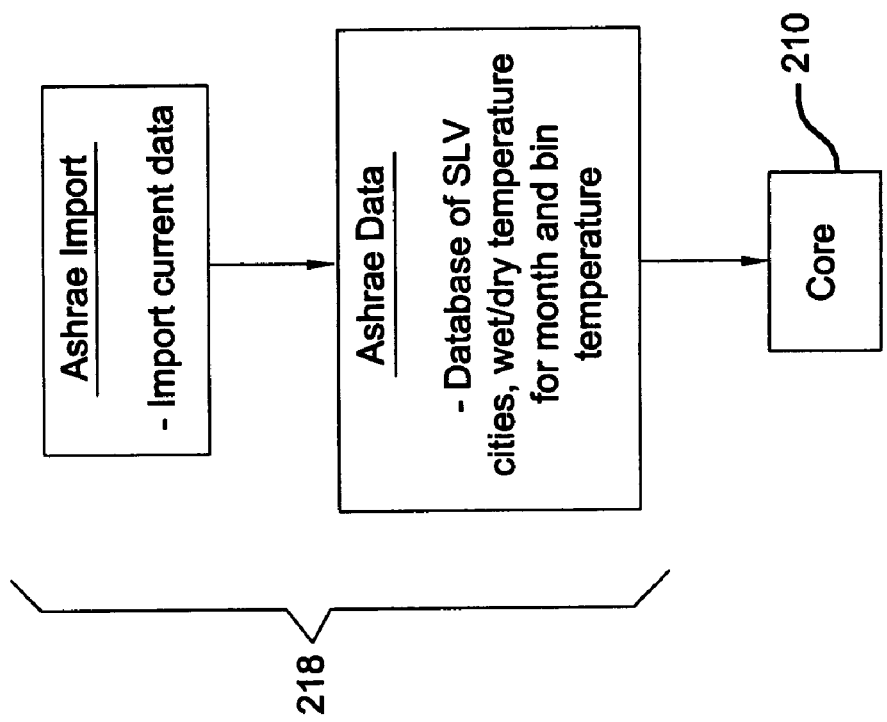
FIG. 12 is a schematic view of a temperature data routine.

With reference to FIG. 10, a schematic overview of the present method and supporting software is shown. In general, the method of the present invention operates around a core calculator 210 that receives information from an input block 212 and provides outputs to both an efficiency block 214 and a design block 216. The input block 212 includes three main components. The first component is weather data 218 provided as a look-up table, based on information from the American Society of Heating, Refrigerating and Air Conditioning Engineers, Inc. (ASHRAE) of Atlanta, Ga., U.S.A. The ASHRAE look-up table includes general climate information for several cities throughout the United States and Canada, as averages over a ten-year period. With reference to FIG. 11, a screen-shot is provided displaying the ASHRAE data as it would appear in an Excel™ workbook and FIG. 12 provides a schematic layout of the ASHRAE component. The ASHRAE data includes both wet and dry bulb temperature data for the remote location 14 during particular months. As seen in FIG. 11, temperature information is provided for specific cities based upon month and a bin temperature. The bin temperatures range from a maximum of one hundred twenty-six and one-half (126.5) degrees Fahrenheit and step down by increments of seven (7) degrees Fahrenheit. Reading FIG. 11, the number of hours a particular city experiences a particular temperature in the particular month, is provided. For example, during the month of January, Edmonton, Alberta, Canada experiences a dry bulb temperature of thirty-five (35) degrees Fahrenheit for a total of eight (8) hours that month. Current ASHRAE data may be imported, as shown in FIG. 13, thereby ensuring the most current data for the dependent calculations. The ASHRAE component provides output information for use by the core calculator.

Figure 14:
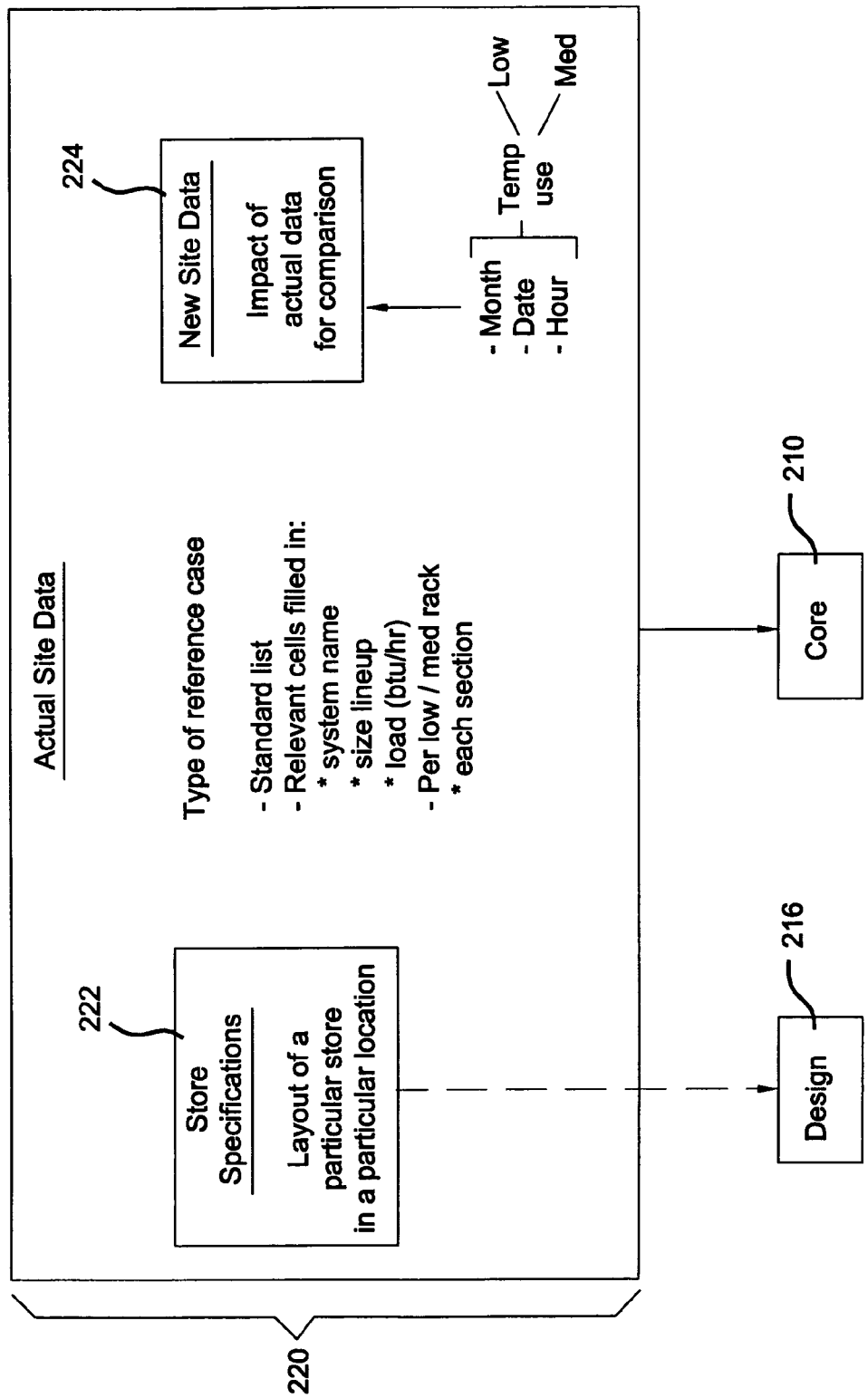
FIG. 14 is a schematic view of an actual site data routine implemented in the energy usage algorithm.
Figure 15:
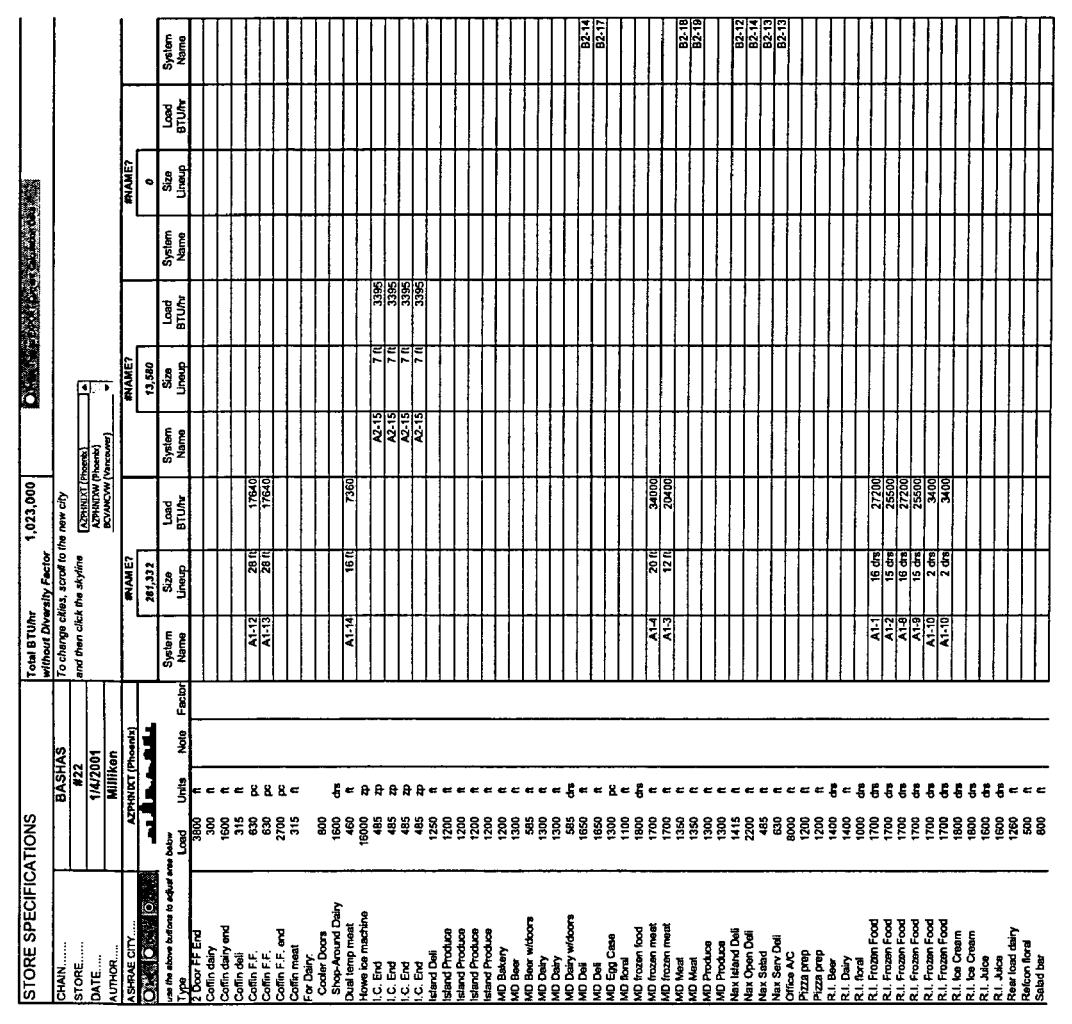

The second component includes actual site data 220, which comprises both store specification and new site data components 222,224, respectively, as shown schematically in FIG. 14. The store specification component 222 accounts for the various refrigeration components operating at a specific remote location 14. With reference to FIG. 15, a screen-shot is provided displaying an exemplary remote location 14 and its related refrigeration components, as it would appear in an Excel™ workbook. A standard component list is provided and only the information for equipment actually on-site is listed in the corresponding cells. This information includes: system name, size line-up and load (BTU/hr). The information is provided per a rack type (i.e., low temperature rack, medium temperature rack, etc.). Particular information from the store specification component 222 is also provided to the design block 216, as described in further detail hereinbelow.

With reference to FIG. 16, a screen-shot is provided displaying exemplary data from a food retailer, as provided by the new site data component. The new site data component 224 is an import sheet that imports actual retailer data by month, date and hour. This data includes ambient temperature and power usage per rack type.

Again referencing FIG. 10, the third component of the input block includes a database 226 of information regarding actual operational parameters for specific equipment types and manufacturers. This information would be provided by CPC, Inc. of Atlanta, Ga., U.S.A. It is anticipated that this information be employed to evaluate a particular component's performance to other component's in the industry as a whole.

The core calculator 210 calculates the projected energy use per rack type. The calculations are provided per ambient temperature and are calculated using information from the input block 212 and the design block 216 as described in more detail below. With particular reference to FIG. 17, a screen-shot is provided displaying a portion of the core calculator 210. As shown, a range of ambient temperatures is provided in the left-most column. It is important to note that these temperatures are not bin temperatures, as described above, but are provided as actual ambient temperatures. The core calculator 210 calculates the total annual energy consumption for both the compressor and condenser of a particular type of rack. These values are shown in the right-most columns of FIG. 17. For example, given an ambient temperature of zero (0) degrees Fahrenheit, the total theoretical compressor energy usage is 29.34 kWh, as based upon individual suction temperatures, and the total theoretical condenser energy usage is 0.5 kWh.

Figure 18:
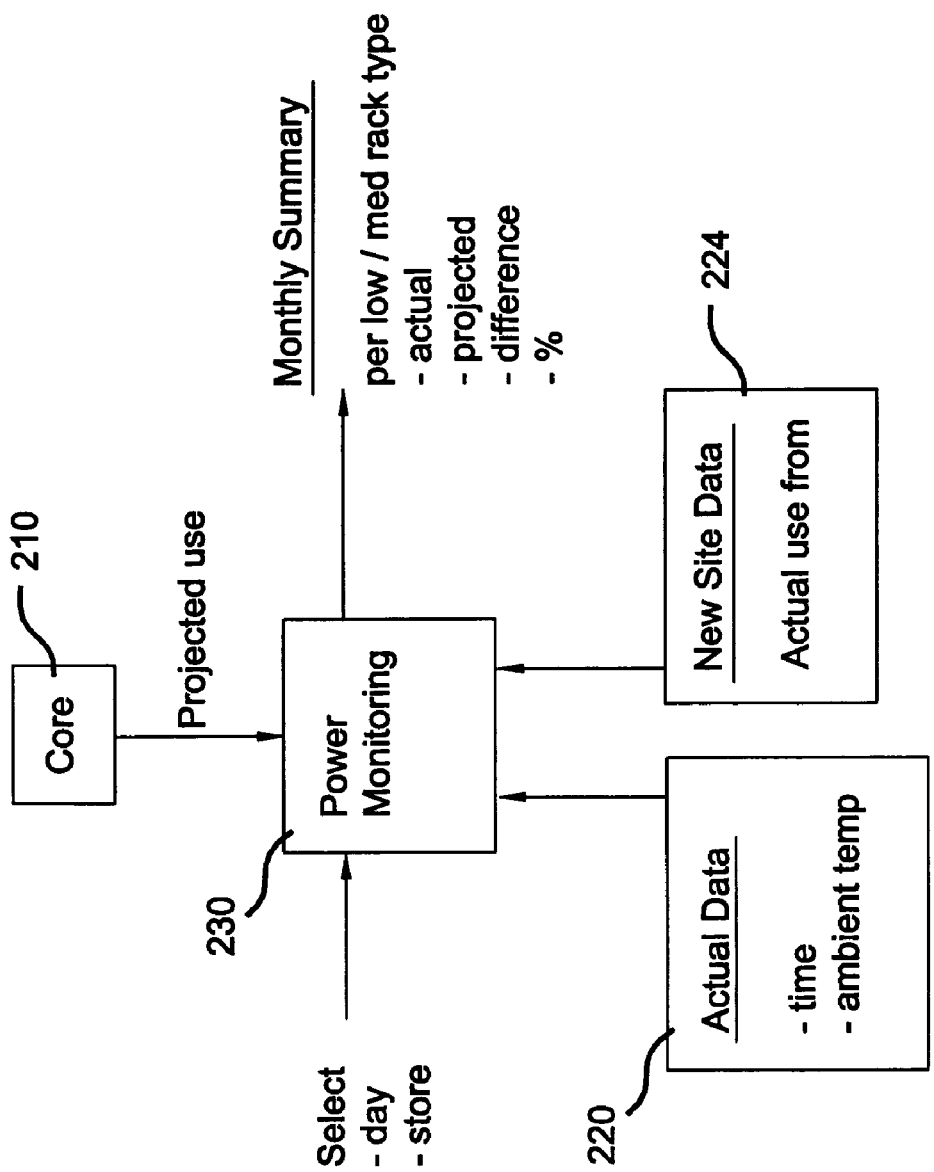
FIG. 18 is a schematic view of a power monitoring routine.
Figure 19:
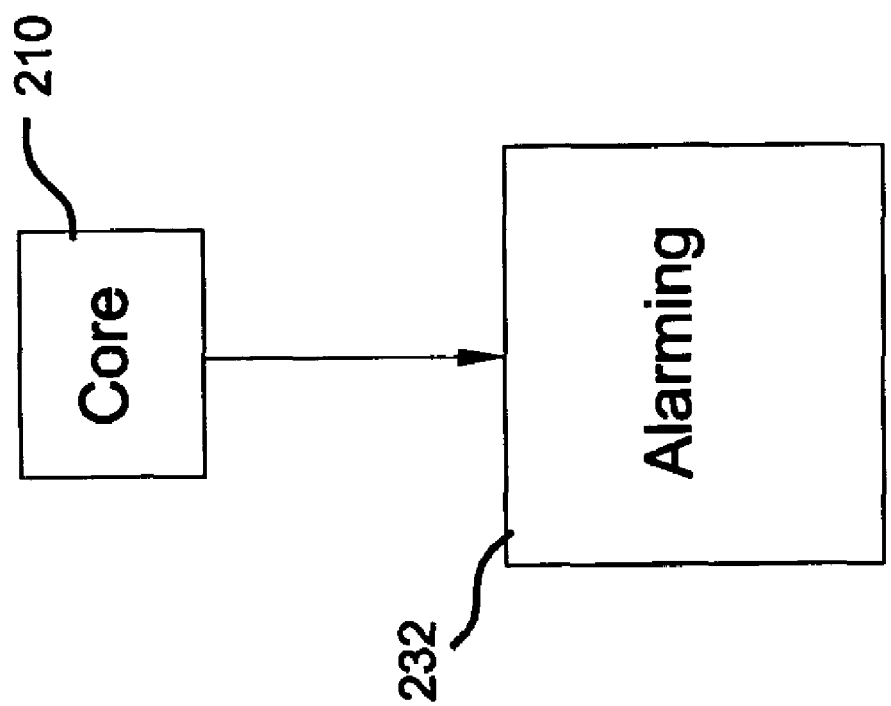
FIG. 19 is a schematic view of an alarming routine.

The efficiency block output includes two main tools: a power monitoring tool 230 and an alarming tool 232, shown schematically in FIGS. 18 and 19, respectively. The power monitoring tool 230 provides an evaluation of the equipment power usage as compared between a calculated value, from the core calculator 210, and the actual power usage, imported from actual site data. The power monitoring tool 230 receives inputs from the core calculator 210, actual site data 220, new site data 224 and its output is a function of operator selectable date, time and location. With reference to FIG. 20, a screen-shot is provided for the power monitoring tool 230. The input received from the core calculator 210 includes a value for the projected use, as referenced by ambient temperature. The actual site data 226 provides the power monitoring tool 230 with the ambient temperature for each hour of the particular day. The new site data 224 provides actual use information, which is manipulated by the power monitoring 230 tool to be summarized by hour, day and month. Using this information, the power monitoring tool 230 provides a summary per rack type, whereby the actual usage is compared to the projected usage and a difference is given. In this manner, the performance of the refrigeration system 100 of a particular remote location 14 may be evaluated for efficiency.

The alarming tool 232 is shown schematically in FIG. 19 and includes alarm limits for alerting a remote location 14 when equipment efficiencies fall below a particular limit. The alarming tool 232 may be implemented on-site, thereby readily providing an efficiency alert to initiate a quick correction action, as well as being implemented at the management center 12.

Figure 21:
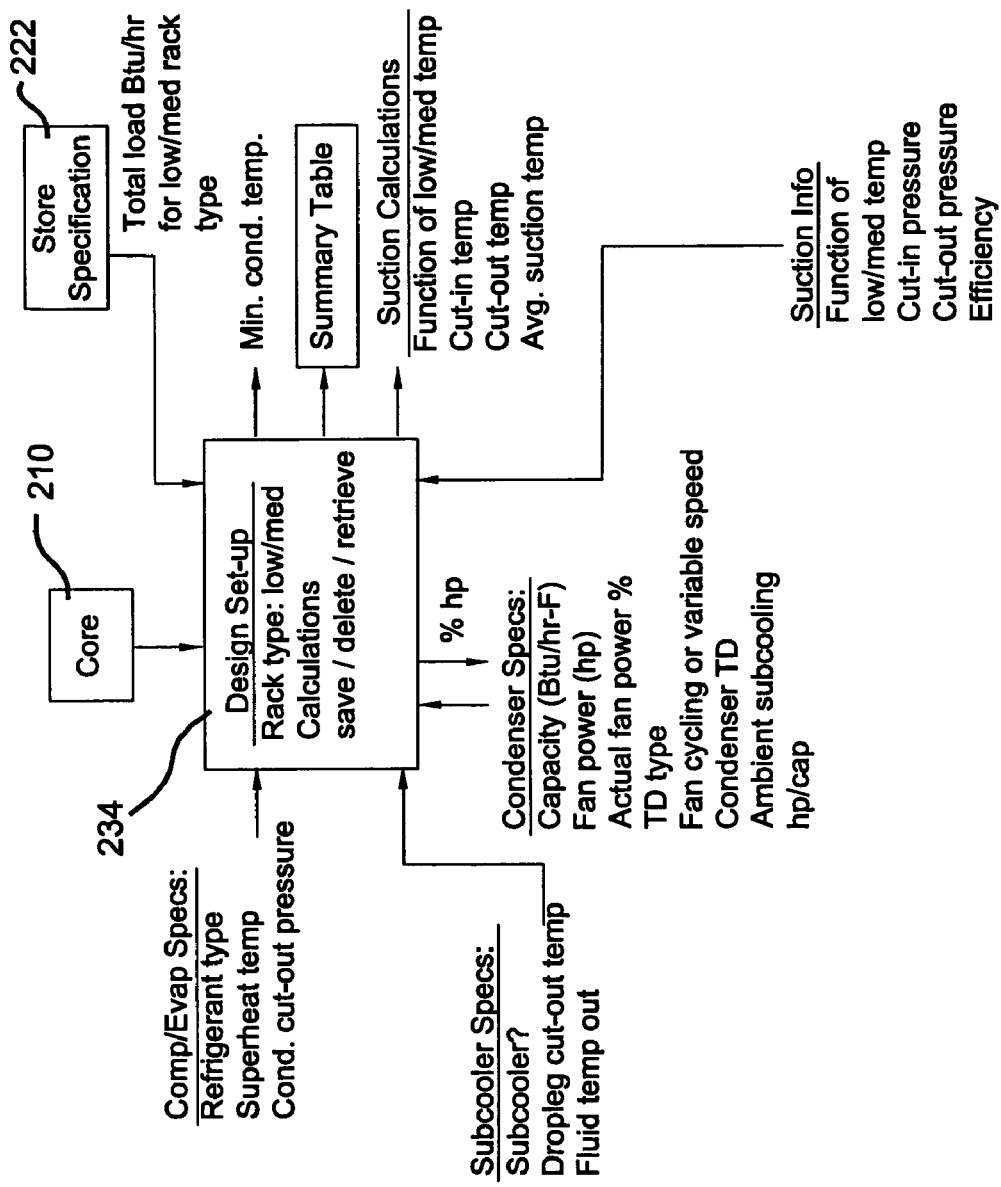
FIG. 21 is a schematic view of a design set-up routine.

With further reference to FIG. 10, the design block output provides energy usage calculations based upon specific design scenarios and includes two components: a design set-up component 234 and a design results component 236. The design set-up component 234 interacts with the core calculator 210, providing the core calculator 210 with input information and receiving calculations therefrom. With reference to FIGS. 21 and 22, a screen-shot and a schematic view are respectively provided for the design set-up component 234. A user may input various design scenario information and is provided with a theoretical annual energy usage calculation.

The design set-up component 234 enables a user to input specific component and operation environment variables to evaluate any one of a number of possible operational scenarios. Each of these scenarios may be saved, deleted and retrieved, as a user desires. The user must input specification information for components such as a compressor, evaporator, sub-cooler, condenser and the like. With respect to the compressor and evaporator, inputs such as refrigerant type, superheat temperature and condenser cut-out pressure are required. The sub-cooler inputs include whether a sub-cooler is present, the dropleg cut-out temperature and fluid out temperature. The condenser inputs include the condenser capacity (BTU/hr—F), fan power (hp), actual fanpower (%), temperature difference type, whether fan cycling or variable speed, condenser temperature difference, ambient sub-cooling and HP capacity. The design set-up component 232 uses the horsepower capacity to determine a % horsepower.

Suction information is also provided per rack type. This information includes cut-in pressure, cut-out pressure and efficiency. Further, the store specification component 222 provides the design set-up component 232 with the total load (BTU/hr) for each rack type of the specific location.

The design set-up component 232 provides a summary table, briefly summarizing the energy usage per rack type. The design set-up component 232 further calculates a minimum condenser temperature, and suction calculations including cut-in temperature, cut-out temperature and average suction temperature.

Figure 23:
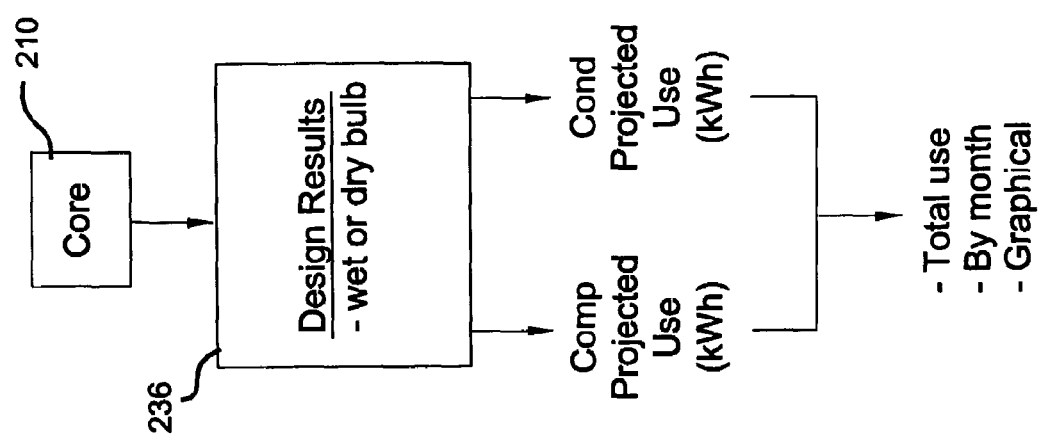
FIG. 23 is a schematic view of a design results routine.
Figure 24:
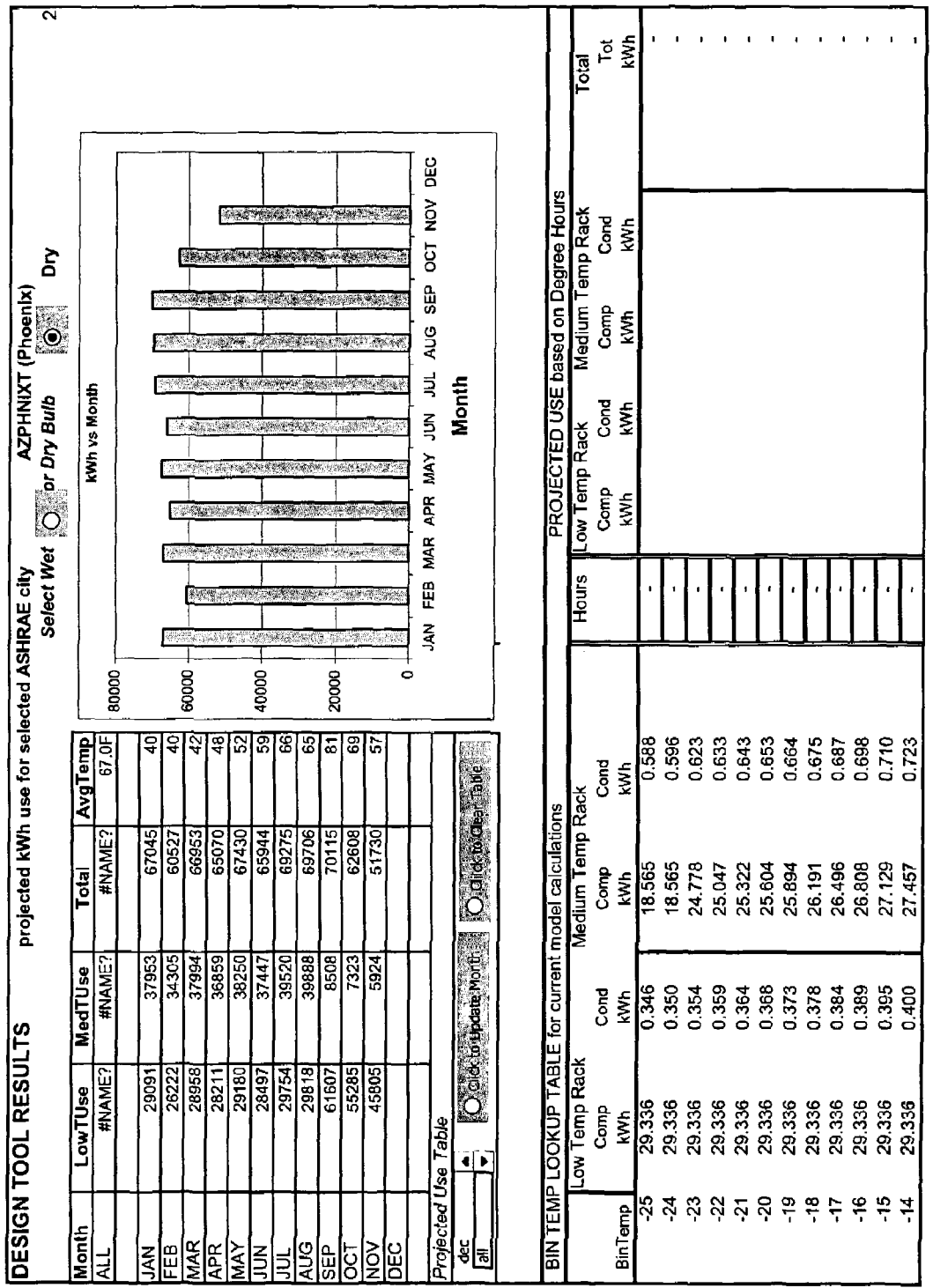
FIG. 24 is a screen-shot of the design results routine.

The design results component 234 provides a more detailed breakdown of the power usage. With reference to FIGS. 23 and 24, a screen-shot and a schematic view are respectively provided for the design results component 234. The design results component 234 provides output information as a function of whether temperature is measured by dry or wet bulb for the given remote location 14. The output information includes projected use in kWh for both the compressor and condenser. This information is further compiled into total use, by month, and displayed graphically.

Figure 25:
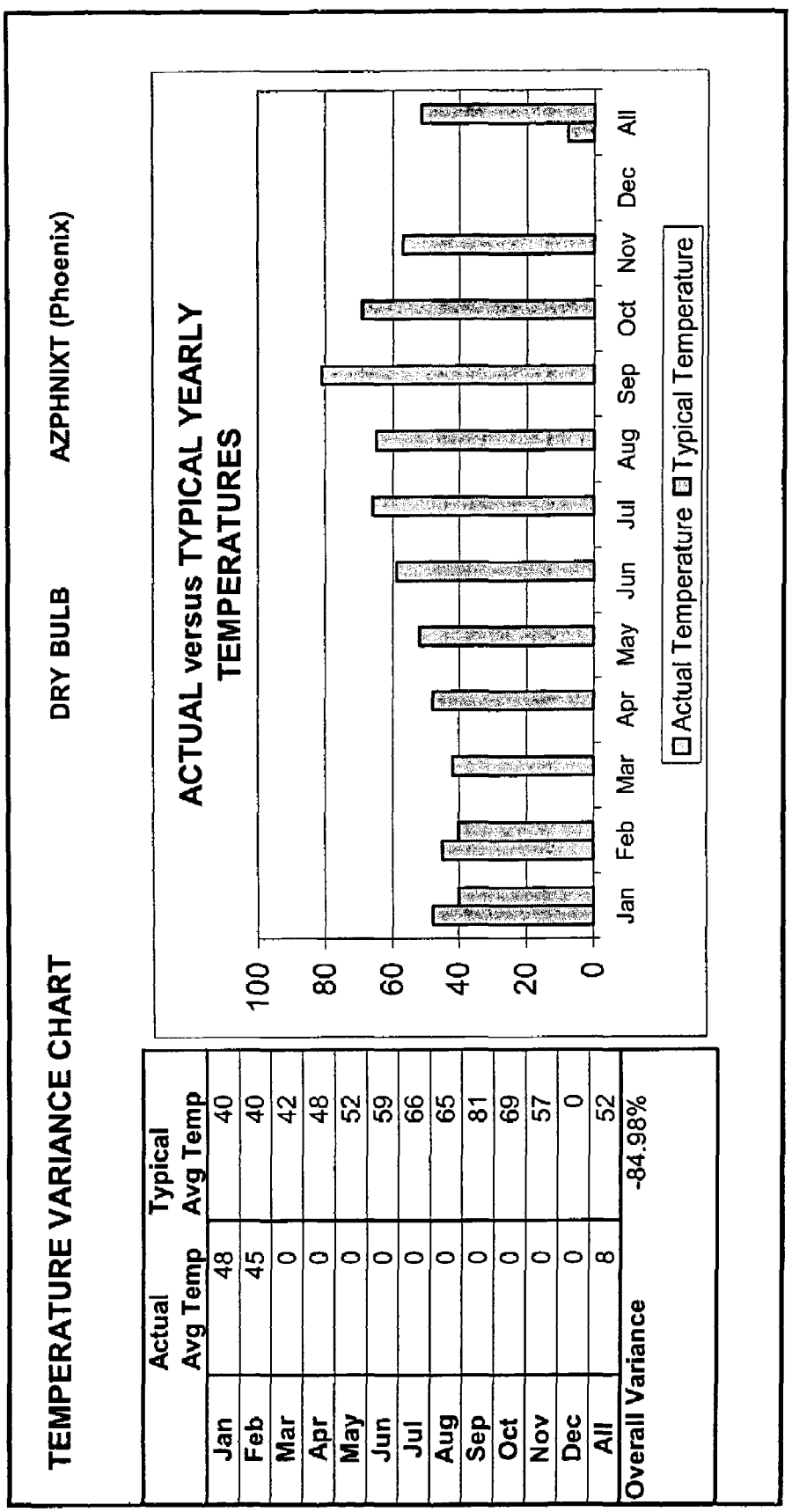
FIG. 25 is a screen-shot of a temperature variation routine.

Because many of the calculations are based upon the provided ASHRAE data, it is important to consider the actual temperatures experienced at a particular location versus the average temperature provided by the ASHRAE data. With reference to FIG. 25, a screen-shot is provided displaying a comparison between the actual average temperatures for a particular month versus typical (i.e., ASHRAE) average temperatures for the particular month. Considering this information, deviations between the projected energy usage and actual energy usage may be more thoroughly evaluated, thereby providing a better analysis of the operation of the refrigeration system 100.

Figure 26:
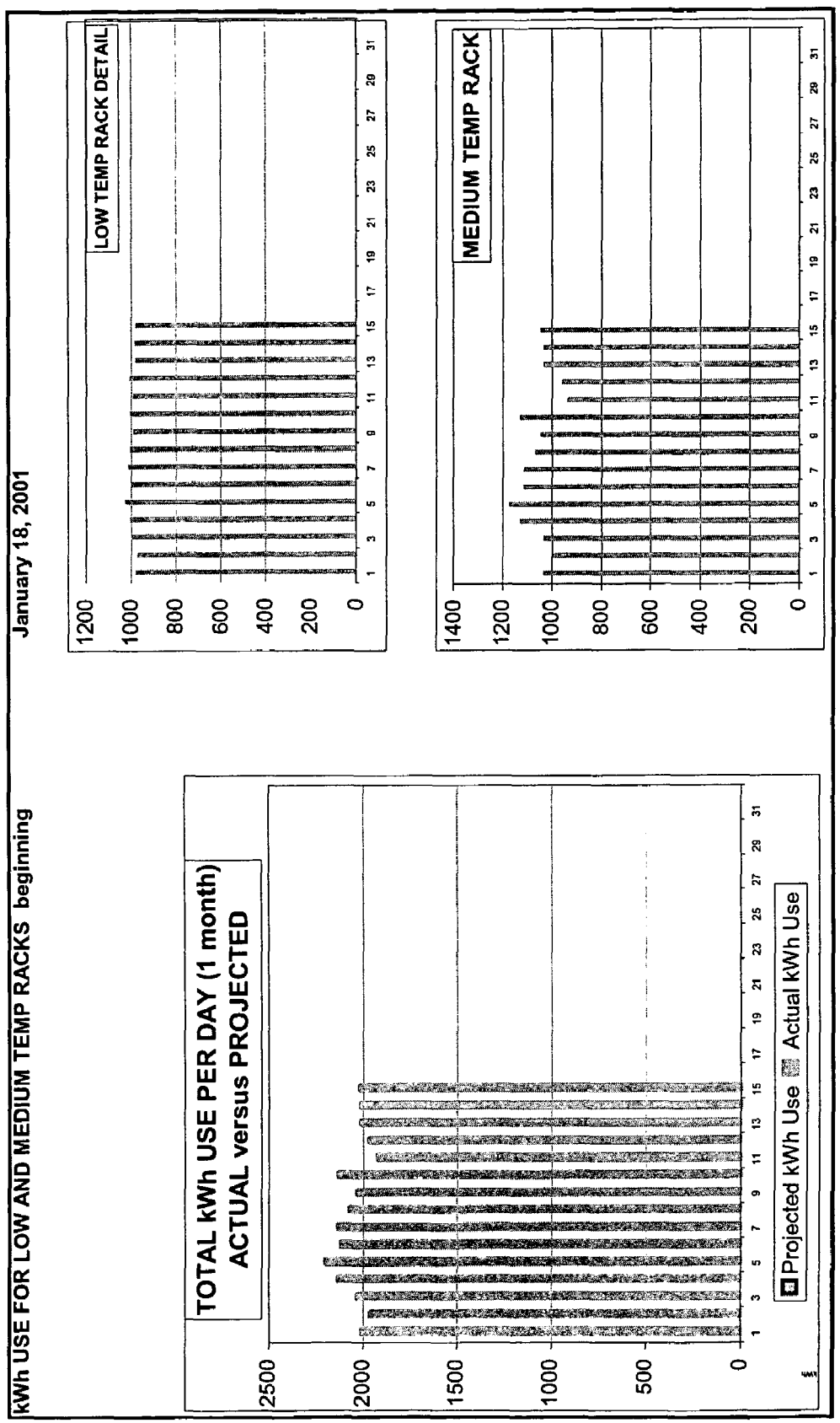
FIG. 26 is a screen-shot showing charts summarizing results of the energy usage algorithm.

With reference to FIG. 26, energy usage characteristics are summarized in tabular form. The total actual and projected energy usage for all rack types is provided on a daily basis for a particular month. Other tables breakdown the total by rack type. In this manner, energy usage performance may be quickly and easily summarized and evaluated for determining future operational activity.

As discussed above, the system 10 of the present invention provides control and evaluation algorithms, in the form of software modules 22, for predicting maintenance requirements for the various components in the remote location 14. In the preferred embodiment, described hereinbelow, predictive maintenance algorithms will be described with respect to the refrigeration system 100.

A first control algorithm is provided for controlling the temperature difference between the refrigerant of the condenser 126 and the ambient air surrounding the condenser 126. The ambient air sensor 128 and the pressure sensor 130 of the condenser 126 are implemented to provide the inputs for the temperature difference control strategy. The pressure sensor 130 measures the refrigerant pressure exiting the condenser 126 and determines a saturation temperature ($T_{SAT}$) from a look-up table, as a function of the type of refrigerant used. The ambient air sensor 128 measures the temperature of the ambient air ($T_{AMB}$). The temperature differential (TD) is then calculated as the difference between the two, according to the following equation:

$$TD = T_{SAT} - T_{AMB}$$

The temperature difference algorithm further implements the following configuration parameters: condenser type (i.e., differential), control type (i.e., pressure), refrigerant type (e.g., R22, R404a), fast recovery, temperature difference set point and minimum temperature set point. In the exemplary embodiment, the temperature difference set point is ten (10) degrees Fahrenheit and the minimum temperature set point ($T_{MIN}$) is seventy (70) degrees Fahrenheit. The minimum temperature set point is the $T_{SAT}$ corresponding to the lowest allowable condenser pressure.

Figure 27A:
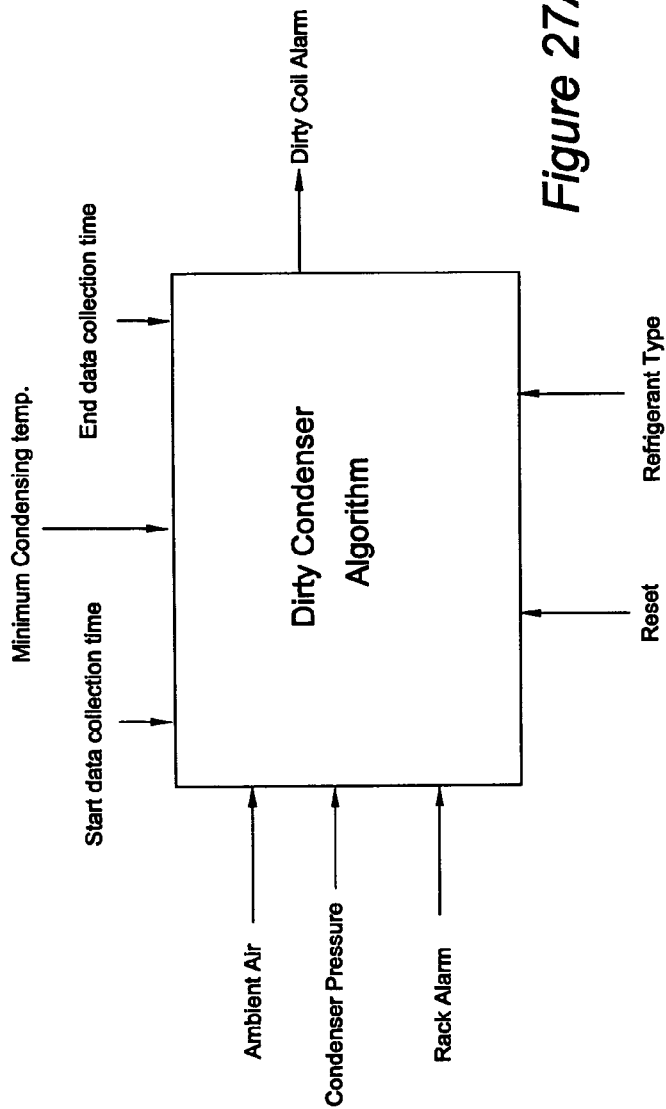
FIG. 27A is a schematic of a dirty condenser algorithm.
Figure 27B:
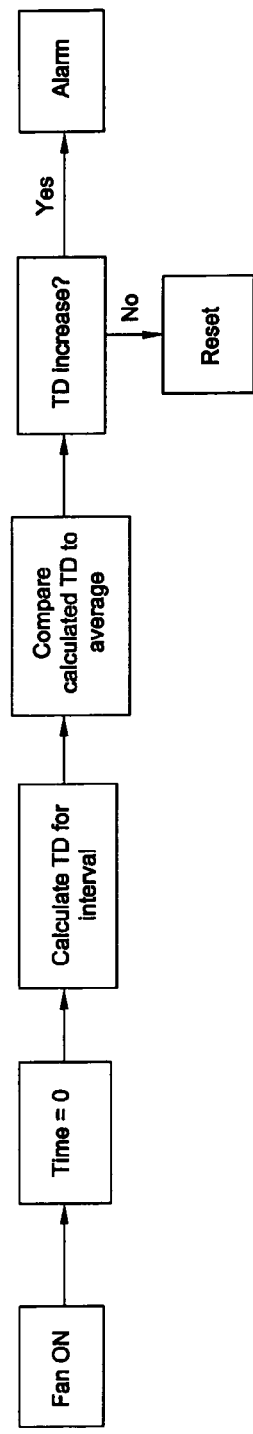
FIG. 27B is a flowchart outlining the dirty condenser algorithm.

A first maintenance algorithm is provided for determining whether the condenser 126 is dirty, as shown in FIGS. 27A and 27B. Predicting the status of the condenser 126 is achieved by measuring the temperature difference for the condenser 126 over a specified period of time. To achieve this, a fan (not shown) associated with the condenser 126 is turned on for a specified period of time (e.g., half hour) and the temperature difference (TD) is calculated, as described above, approximately every five (5) seconds. The average of the TD calculations is determined and stored into memory. An increase in the average TD indicates that the condenser 126 is dirty and requires cleaning. In this case an alarm is signaled. It should be noted, however, that the TD value is only meaningful if $T_{AMB}$ is at least ten (10) degrees Fahrenheit lower than $T_{MIN}$. If the condenser 126 has been cleaned, the dirty condenser algorithm of the controller must be reset for recording a new series of TDs.

The present invention further provides an alternative algorithm for detecting a dirty condenser situation. Specifically, the heat rejection (Q) of the condenser 126 is evaluated. The heat rejection is a function of an overall heat transfer coefficient (U), a heat transfer area (A) and a log mean temperature difference (LMTD), and is calculated by the following equation:

$$Q = U \times A \times (LMTD)$$

The LMTD can be approximated as the TD measurements, described above. A value for Q can be approximated from the percentage output of the compressors 102 operating with the condenser 126. Further, the above equation can be rearranged to solve for U:

$$U = Q/A \times TD$$

Thus, U can be consistently monitored for the condenser 126. An increase in the calculated value of U is indicative of a dirty condenser situation.

Figure 28:
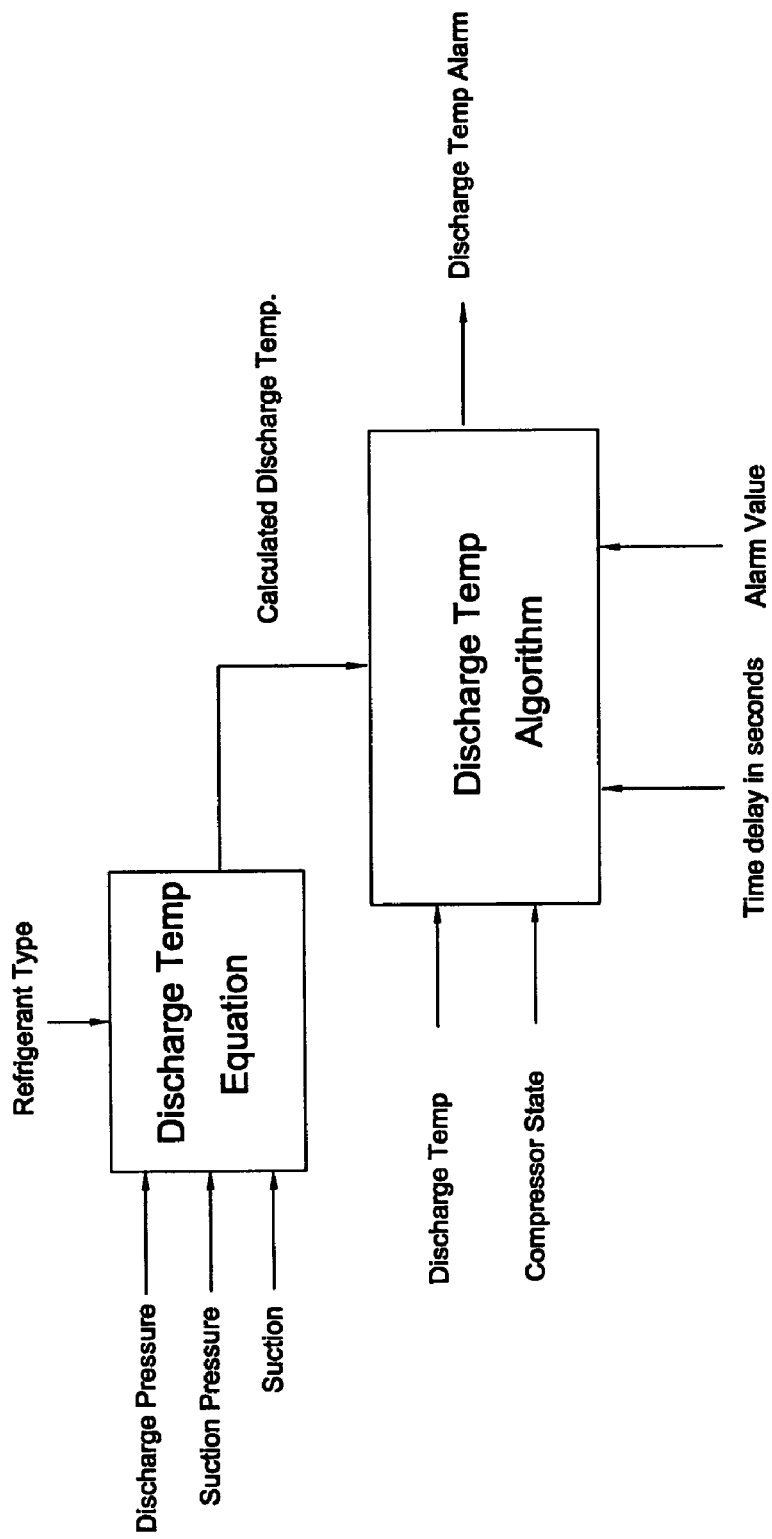
FIG. 28 is a schematic of a discharge temperature algorithm.

A second maintenance algorithm is provided as a discharge temperature monitoring algorithm, shown in FIG. 28, usable to detect compressor malfunctioning. For a given suction pressure and refrigerant type, there is a corresponding discharge temperature for the compressor 102. The discharge temperature monitoring algorithm compares actual discharge temperature ($T_{DIS\_ACT}$) to a calculated discharge temperature ($T_{DIS\_THR}$). $T_{DIS\_ACT}$ is measured by the temperature sensors 114 associated with the discharge of each compressor 102. Measurements are taken at approximately 10 second intervals while the compressors 102 are running. $T_{DIS\_THR}$ is calculated as a function of the refrigerant type, discharge pressure ($P_{DIS}$), suction pressure ($P_{SUC}$) and suction temperature ($T_{SUC}$), each of which are measured by the associated sensors described hereinabove. An alarm value (A) and time delay (t) are also provided as presets and may be user selected. An alarm is signaled if the difference between the actual and calculated discharge temperature is greater than the alarm value for a time period longer than the time delay. This is governed by the following logic:

If $(T_{DIS\_ACT} - T_{DIS\_THR}) > A$ and time$>t$, then alarm

A third maintenance algorithm is provided as a compressor superheat monitoring algorithm, shown schematically in FIGS. 29A and 29B, usable to detect liquid refrigerant flood back. The superheat is measured at both the compressor suction manifold 106 and discharge header 108. The basis of the compressor superheat monitoring algorithm is that when liquid refrigerant migrates to the compressor 102, superheat values decrease dramatically. The present algorithm detects sudden decreases in superheat values at the suction manifold 106 and discharge header 108 for providing an alarm.

With particular reference to FIG. 29A, the superheat monitoring at the suction manifold 106 will be described in detail. Initially, $T_{SUC}$ and $P_{SUC}$ are measured by the suction temperature and pressure sensors 120,118 and it is further determined whether all of the compressors 102 are on. A saturation temperature ($T_{SAT}$) is determined by referencing a look-up table using $P_{SUC}$ and the refrigerant type. An alarm value (A) and time delay (t) are also provided as presets and may be user selected. An exemplary alarm value is fifteen (15) degrees Fahrenheit. The suction superheat ($SH_{SUC}$) is determined by the difference between $T_{SUC}$ and $T_{SAT}$. An alarm will be signaled if $SH_{SUC}$ is greater than the alarm value for a time period longer than the time delay. This is governed by the following logic:

If $SH_{SUC} > A$ and time$>t$, then alarm

With particular reference to FIG. 29B, the superheat monitoring at the discharge header 108 will be described in detail. Initially, discharge temperature ($T_{DIS}$) and discharge pressure ($P_{DIS}$) are measured by the discharge temperature and pressure sensors 114,124. It is also determined whether the particular compressor 102 is on. A saturation temperature ($T_{SAT}$) is determined by referencing a look-up table using PDIS and the refrigerant type. An alarm value (A) and time delay (t) are also provided as presets and may be user selected. An exemplary alarm value is fifteen (15) degrees Fahrenheit. The discharge superheat ($SH_{DIS}$) is determined by the difference between $T_{DIS}$ and $T_{SAT}$. An alarm is signaled if $SH_{DIS}$ is greater than the alarm value for a time period longer than the time delay. This is governed by the following logic:

If $SH_{SUC} > A$ and time$>t$, then alarm

A severe flood back alarm is also provided. A severe flood back occurs when both a suction flood back state and a discharge flood back state are determined. In the event that both the suction flood back alarm and the discharge flood back alarm are signaled, as described above, the severe flood back alarm is signaled.

Figure 30:
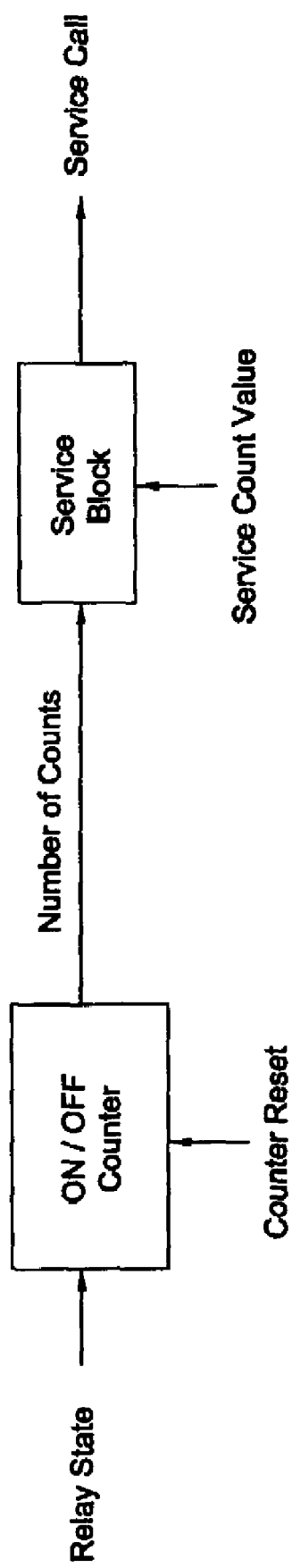
FIG. 30 is a schematic of service call algorithm.

A fourth maintenance algorithm is provided as a relay output monitoring algorithm, shown schematically in FIG. 30, usable to initiate an electrical contractor service call. In general, the relay output monitoring algorithm counts the number of on/off transition states for a given relay. The number of counts is provided to a service block that is preset with a service count value. If the number of counts is greater than the service count value then a service call is automatically placed to an electrical contractor.

More specifically, the algorithm initially sets an old relay state to OFF if a counter reset has been signaled or the algorithm is running for the first time. Next, the algorithm retrieves a new relay state value (i.e., ON or OFF). The algorithm then compares the new relay state value to the old relay state value. If they are unequal, the number counter is increased by a single increment.

Other maintenance algorithms include: contactor count, compressor run-time, oil checks, dirty air filter and light bulb change. The contactor count algorithm counts the number of times a compressor 102 cycles (i.e., turned ON/OFF). A contactor count limit is provided, whereby once the number of cycles surpasses the count limit, a work order is automatically issued by the system for signaling preventative maintenance. Similarly, the compressor run-time algorithm monitors the amount of time a compressor 102 has run. A run-time limit is provided, whereby once the run-time surpasses the run-time limit, a work order is automatically issued by the system for signaling routine maintenance.

Figure 31:
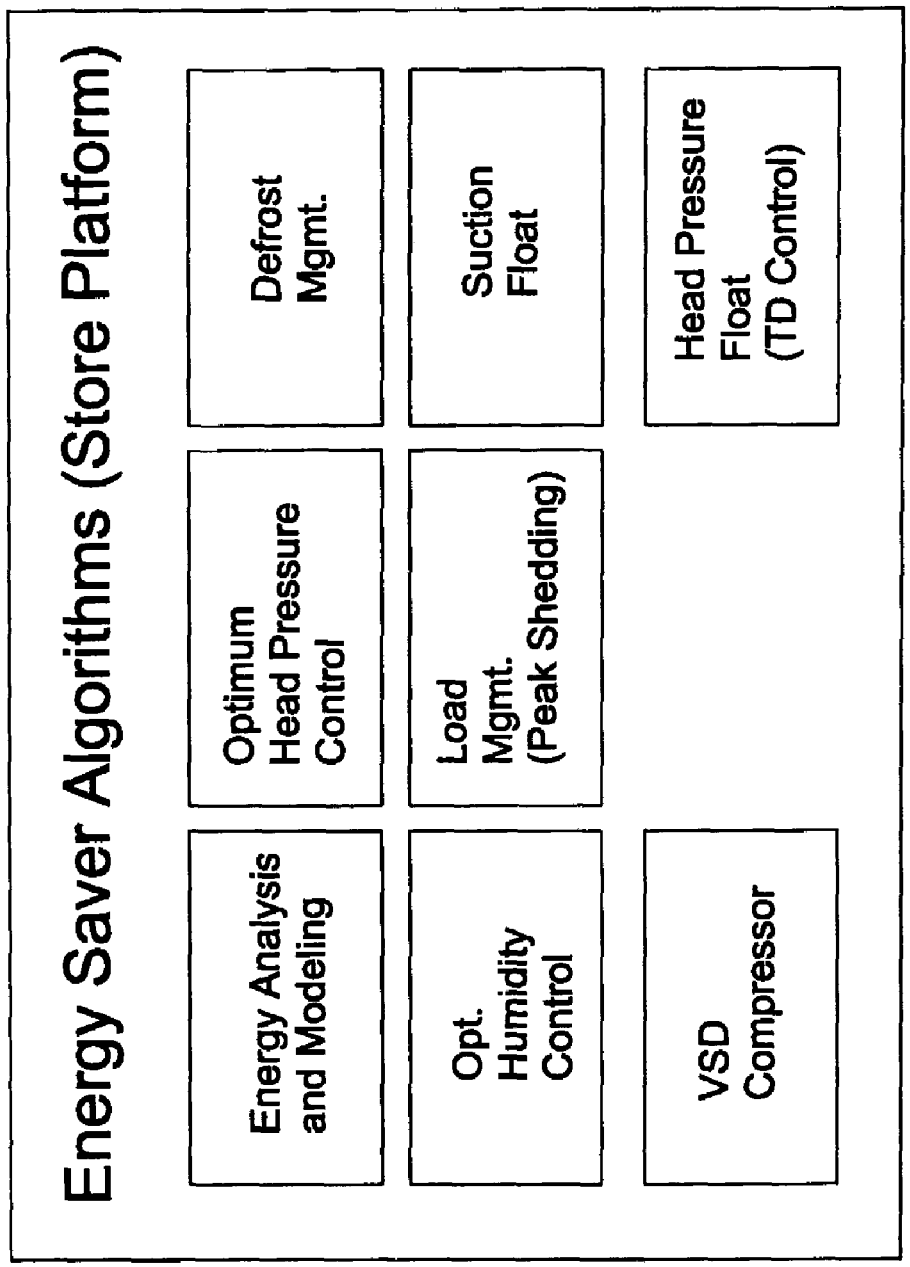
FIG. 31 is a schematic diagram of energy saving algorithms implemented by the system of the present invention.

As discussed in detail above, the system 10 of the present invention provides a method of monitoring and evaluating energy consumption for various components of the refrigeration system 100. It is further anticipated, however, that the present system 10 includes additional algorithms for optimizing energy efficiency of all energy using devices within a location. To this end, power meters are provided for significant energy components of the location, including but not limited to: refrigeration circuits and condensers, HVAC, lighting, etc. With reference to FIG. 31, it is anticipated that the system 10 provides energy saving algorithms for each of the identified areas, including: the VSD compressor, optimum humidity control, optimum head pressure control, load management, defrost management, suction float and head pressure float.

Figure 33:
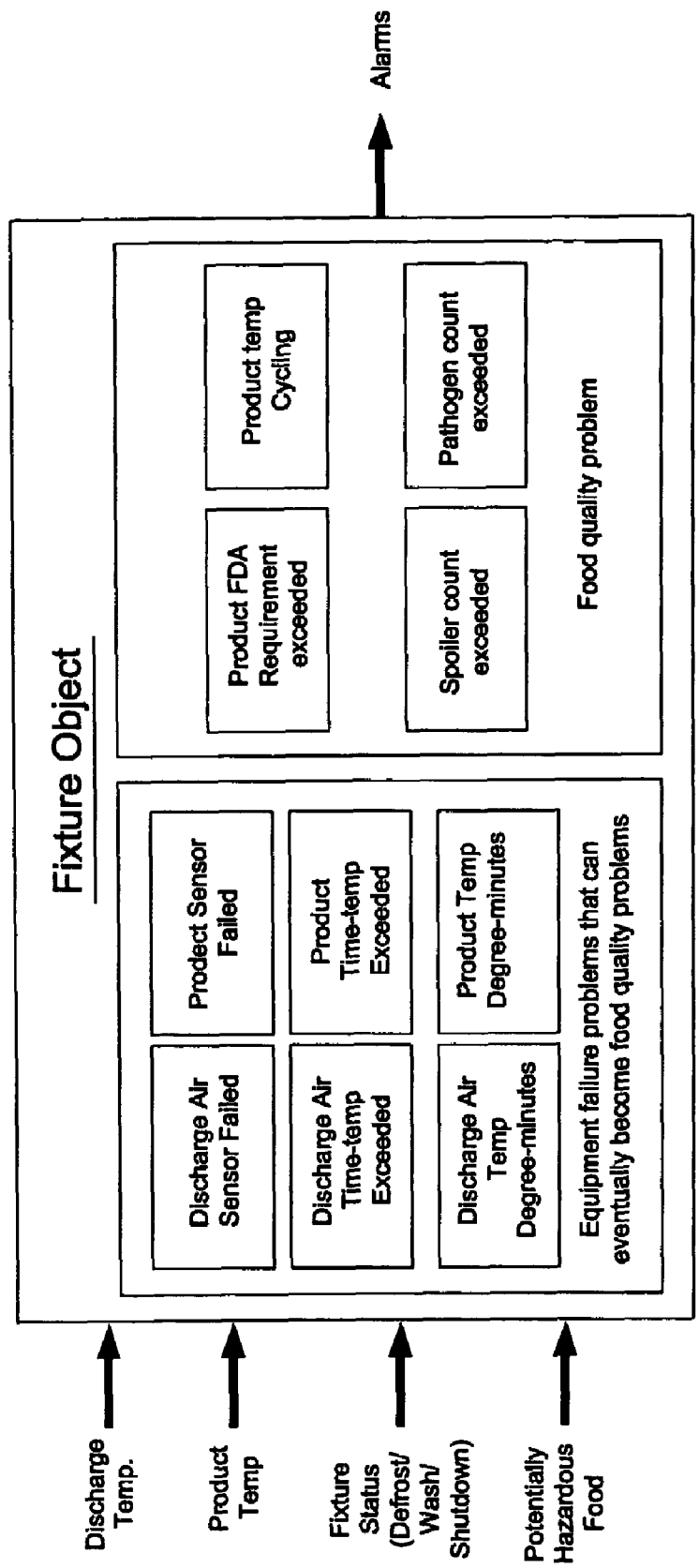
FIG. 33 is a schematic view of the alarming conditions implemented by the system of the present invention.

The system 10 of the present invention further provides an alarming system for alerting the management center 12 or intermediate processing center of particular situations. The graph provided in FIG. 32 outlines ten main alarming conditions and the corresponding operator action. These alarming conditions include: discharge air temperature sensor failure, product temperature sensor failure, discharge air temperature exceeded, discharge air degree-minute exceeded, product time-temperature exceeded, product degree-minute exceeded, product FDA time-temperature exceeded, spoiler count exceeded, pathogen count exceeded and product temperature cycling. As shown schematically in FIG. 33, the first six alarming conditions relate to equipment failure that would potentially lead to food quality and safety problems. The last four alarming conditions relate directly to food quality and safety.

Figure 34:
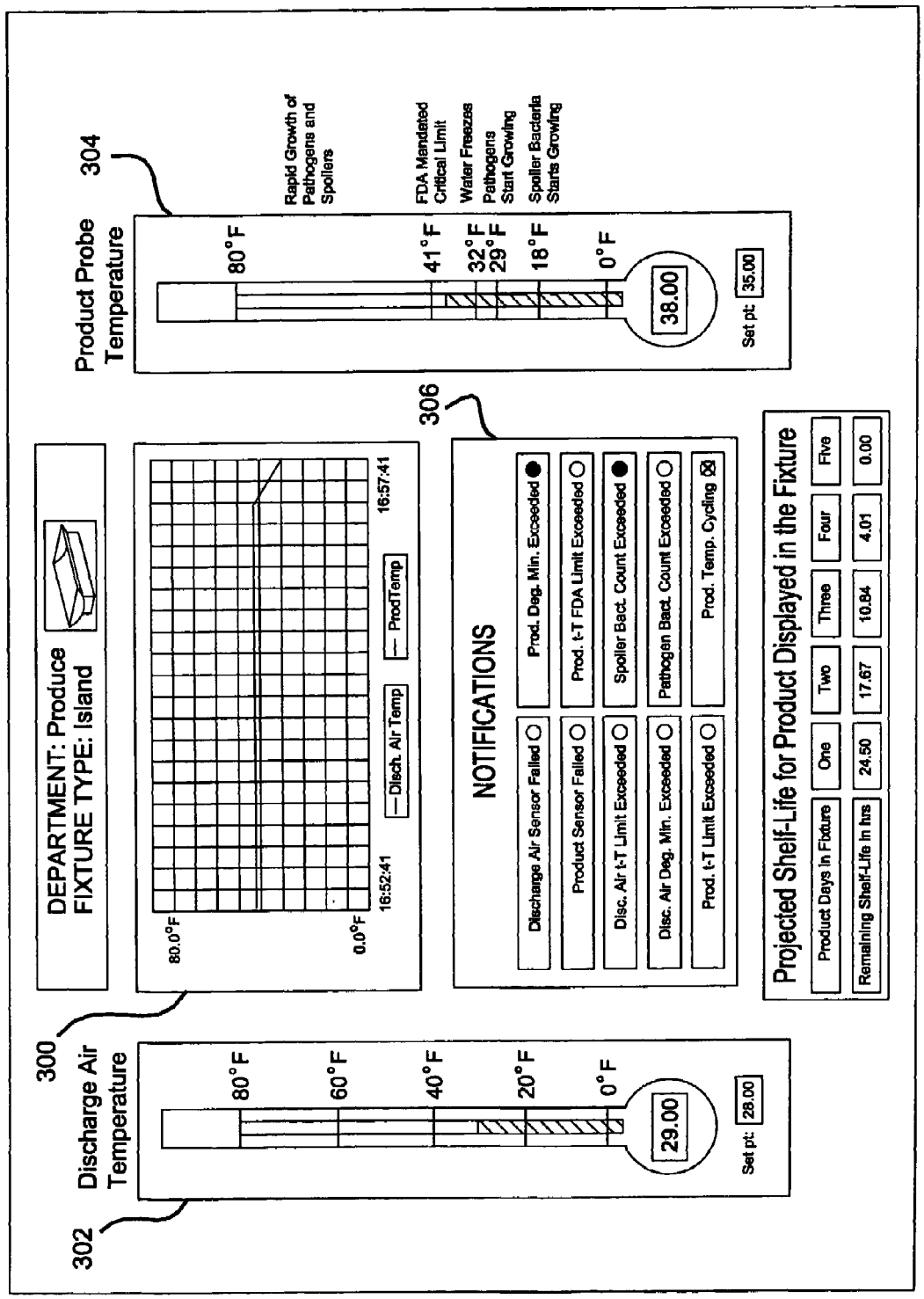
FIG. 34 is a screen-shot of a user interface of the system for monitoring a particular food storage case of a particular location.

As described in detail above, the system 10 provides a web-based operator interface for monitoring the conditions of a remote location 14. With reference to FIG. 34, a screen-shot is provided detailing an exemplary user interface for monitoring the status of a particular fixture within a particular remote location 14. The centrally disposed graph 300 provides real-time output of both the discharge air temperature and the product temperature, as provided by the product simulators, described above. Further provided are discharge air temperature and product probe temperature thermometers 302,304 for representing current temperature conditions. Disposed immediately below the real-time graph 300 is a notifications board 306 displaying each of the ten alarming conditions described above. Immediately below the notifications board 306 is a shelf-life estimation board 308 that shows the number of shelf-life hours remaining per the number of days a particular product has been stored within a particular case. The shelf-life estimation is calculated as described in detail above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of managing a refrigeration system, said method comprising:
    monitoring an energy consumption of said refrigeration system;
    accessing a source of weather data;
    calculating an energy consumption projection based on weather data;
    comparing said energy consumption with said energy consumption projection; and
    determining refrigeration system performance based on said comparing.

2. The method of claim 1 further comprising:
    accessing maintenance indicator data of said refrigeration system;
    analyzing said maintenance indicator data; and
    determining refrigeration system performance based on said analyzing.

3. The method of claim 2 further comprising transmitting said maintenance indicator data to a management center wherein said determining refrigeration system performance occurs at said management center.

4. The method of claim 3, wherein said transmitting said maintenance indicator data includes transmitting through a communication gateway to said management center.

5. The method of claim 4, further comprising post-processing said maintenance indicator data at said communication gateway.

6. The method of claim 2, further comprising altering a configuration of said refrigeration system based on said analyzing.

7. The method of claim 2, further comprising outputting a work order based on said analyzing.

8. The method of claim 2, further comprising advising manipulation of the refrigeration system based on said analyzing.

9. The method of claim 2, wherein said analyzing said maintenance indicator data includes analyzing condenser condition data.

10. The method of claim 2, wherein said analyzing said maintenance indicator data includes analyzing compressor condition data.

11. The method of claim 2, wherein said analyzing said maintenance indicator data includes analyzing liquid refrigerant flood back data.

12. The method of claim 2, wherein said analyzing said maintenance indicator data includes analyzing relay output data.

13. The method of claim 2, wherein said analyzing said maintenance indicator data includes analyzing contactor count data.

14. The method of claim 2, wherein said analyzing said maintenance indicator data includes analyzing compressor run-time data.

15. The method of claim 2, wherein said analyzing said maintenance indicator data includes analyzing oil check data.

16. The method of claim 2, wherein said analyzing said maintenance indicator data includes analyzing air filter data.

17. The method of claim 2, wherein said analyzing said maintenance indicator data includes analyzing light bulb change data.

18. The method of claim 1, further comprising:
    accessing food condition data of said refrigeration system;
    analyzing said food condition data; and
    determining refrigeration system performance based on said analyzing.

19. The method of claim 18 further comprising transmitting said food condition data to a management center wherein said determining refrigeration system performance occurs at said management center.

20. The method of claim 19, wherein said transmitting said food condition data includes transmitting through a communication gateway to said management center.

21. The method of claim 20, further comprising post-processing said food condition data at said communication gateway.

22. The method of claim 18, further comprising altering a configuration of said refrigeration system based on said analyzing.

23. The method of claim 18, further comprising outputting a work order based on said analyzing.

24. The method of claim 18, further comprising advising manipulation of the refrigeration system based on said analyzing.

25. The method of claim 18, wherein said analyzing said food condition data includes calculating a food quality index.

26. The method of claim 25, further comprising alarming as a function of said food quality index.

27. The method of claim 18, wherein said analyzing includes calculating a food safety index.

28. The method of claim 27, further comprising alarming as a function of said food safety index.

29. The method of claim 1 wherein said determining refrigeration system performance comprises at least one of monitoring, diagnosing and prognosing refrigeration system performance.

30. The method of claim 1 further comprising transmitting said energy consumption to a management center wherein said determining refrigeration system performance occurs at said management center.

31. The method of claim 30, wherein said transmitting includes transmitting through a communication gateway to said management center.

32. The method of claim 31, further comprising post-processing said energy consumption at said communication gateway.

33. The method of claim 30, further comprising locating said refrigeration system at a retail location and locating said management center at a remote location located remotely to said retail location.

34. The method of claim 1, further comprising altering a configuration of said refrigeration system based on said comparing.

35. The method of claim 1, wherein said weather data is historical weather data.

36. The method of claim 1, wherein said weather data is actual weather data.

37. The method of claim 1, further comprising outputting a work order based on said comparing.

38. The method of claim 1, further comprising advising manipulation of said refrigeration system based on said comparing.

* * * * *